(12) United States Patent  (10) Patent No.: US 8,612,546 B2
Trivedi et al.  (45) Date of Patent: *Dec. 17, 2013

(54) SYSTEM AND METHOD FOR TRANSFERRING DATA AMONG COMPUTING ENVIRONMENTS

(75) Inventors: Pooja Trivedi, Fort Lauderdale, FL (US); Georgy Momchilov, Fort Lauderdale, FL (US); David Pope, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/460,247

(22) Filed: Apr. 30, 2012

(65) Prior Publication Data

US 2012/0216126 A1 Aug. 23, 2012

Related U.S. Application Data

(63) Continuation of application No. 11/941,521, filed on Nov. 16, 2007, now Pat. No. 8,190,707.

(60) Provisional application No. 60/981,486, filed on Oct. 20, 2007.

(51) Int. Cl.
  *G06F 15/16* (2006.01)
  *G06F 11/00* (2006.01)
(52) U.S. Cl.
  USPC ............ 709/218; 370/229; 370/235; 709/227
(58) Field of Classification Search
  USPC .................................................. 709/217–219
  See application file for complete search history.

(56) References Cited

U.S. PATENT DOCUMENTS

| 4,949,248 A | 8/1990 | Caro |
| 5,771,353 A | 6/1998 | Eggleston et al. |
| 5,790,977 A | 8/1998 | Ezekiel |
| 5,835,090 A | 11/1998 | Clark et al. |

(Continued)

FOREIGN PATENT DOCUMENTS

WO WO-01/90912 A1 11/2001

OTHER PUBLICATIONS

International Search Report for PCT Application No. PCT/US08/075543, mailed Dec. 12, 2008, 2 pages.

(Continued)

*Primary Examiner* — Evans Desrosiers
(74) *Attorney, Agent, or Firm* — Foley and Lardner LLP; John D. Lanza

(57) ABSTRACT

Systems and methods for transferring data among computing environments include a method for transferring data items among a portion of a remote computing environment and a portion of a local computing environment using a presentation layer protocol. Data items are transferred during transfer cycles and upon the release of data objects into a destination computing environment. Transfer cycles may transfer data among local and remote computing environments, among more than one remote computing environment, and may further transfer in parallel with other transfer cycles. A first transfer cycle transferring a first data item continues to transfer the first data item when a second transfer cycle initializes and transfers a second data item during a portion of the first transfer cycle. Data operations may be performed on data items during the transfer of a data item, and data items may be compressed or segmented prior to transfer.

16 Claims, 13 Drawing Sheets

(56) References Cited

U.S. PATENT DOCUMENTS

| | | |
|---|---|---|
| 5,835,724 A | 11/1998 | Smith |
| 5,838,910 A | 11/1998 | Domenikos et al. |
| 5,862,325 A | 1/1999 | Reed et al. |
| 5,896,533 A | 4/1999 | Ramos et al. |
| 5,905,492 A | 5/1999 | Straub et al. |
| 5,928,324 A | 7/1999 | Sloan |
| 5,990,852 A | 11/1999 | Szamrej |
| 6,002,402 A | 12/1999 | Schacher |
| 6,055,575 A | 4/2000 | Paulsen et al. |
| 6,088,717 A | 7/2000 | Reed et al. |
| 6,185,609 B1 | 2/2001 | Rangarajan et al. |
| 6,219,669 B1 | 4/2001 | Haff et al. |
| 6,233,600 B1 | 5/2001 | Salas et al. |
| 6,233,617 B1 | 5/2001 | Rothwein et al. |
| 6,263,363 B1 | 7/2001 | Rosenblatt et al. |
| 6,289,382 B1 | 9/2001 | Bowman-Amuah |
| 6,332,163 B1 | 12/2001 | Bowman-Amuah |
| 6,339,832 B1 | 1/2002 | Bowman-Amuah |
| 6,340,977 B1 | 1/2002 | Lui et al. |
| 6,345,239 B1 | 2/2002 | Bowman-Amuah |
| 6,345,288 B1 | 2/2002 | Reed et al. |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,571 B1 | 8/2002 | Haff et al. |
| 6,442,748 B1 | 8/2002 | Bowman-Amuah |
| 6,449,651 B1 | 9/2002 | Dorfman et al. |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,519,571 B1 | 2/2003 | Guheen et al. |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,536,057 B2 | 3/2003 | Fennell et al. |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,584,569 B2 | 6/2003 | Reshef et al. |
| 6,594,692 B1 | 7/2003 | Reisman |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,611,862 B2 | 8/2003 | Reisman |
| 6,611,867 B1 | 8/2003 | Bowman-Amuah |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,631,512 B1 | 10/2003 | Onyeabor |
| 6,633,742 B1 | 10/2003 | Turner et al. |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,658,464 B2 | 12/2003 | Reisman |
| 6,691,301 B2 | 2/2004 | Bowen |
| 6,715,145 B1 | 3/2004 | Bowman-Amuah |
| 6,721,713 B1 | 4/2004 | Guheen et al. |
| 6,731,625 B1 | 5/2004 | Eastep et al. |
| 6,742,015 B1 | 5/2004 | Bowman-Amuah |
| 6,757,710 B2 | 6/2004 | Reed |
| 6,789,252 B1 | 9/2004 | Burke et al. |
| 6,807,668 B2 | 10/2004 | Stern et al. |
| 6,816,904 B1 | 11/2004 | Ludwig et al. |
| 6,842,906 B1 | 1/2005 | Bowman-Amuah |
| 6,850,956 B1 | 2/2005 | Knutson |
| 6,867,880 B2 | 3/2005 | Silverbrook et al. |
| 6,920,502 B2 | 7/2005 | Araujo et al. |
| 6,957,186 B1 | 10/2005 | Guheen et al. |
| 6,987,581 B2 | 1/2006 | Silverbrook et al. |
| 6,995,859 B1 | 2/2006 | Silverbrook et al. |
| 6,996,530 B2 | 2/2006 | Shizuka et al. |
| 7,034,953 B2 | 4/2006 | Silverbrook et al. |
| 7,047,498 B2 | 5/2006 | Lui et al. |
| 7,117,504 B2 | 10/2006 | Smith et al. |
| 7,127,501 B1 | 10/2006 | Beir et al. |
| 7,165,041 B1 | 1/2007 | Guheen et al. |
| 7,225,244 B2 | 5/2007 | Reynolds et al. |
| 2001/0047406 A1 | 11/2001 | Araujo et al. |
| 2002/0029285 A1 | 3/2002 | Collins |
| 2002/0032725 A1 | 3/2002 | Araujo et al. |
| 2002/0072927 A1 | 6/2002 | Phelan et al. |
| 2002/0184224 A1 | 12/2002 | Haff et al. |
| 2002/0188726 A1* | 12/2002 | Schick et al. ............... 709/227 |
| 2003/0014442 A1 | 1/2003 | Shiigi et al. |
| 2003/0046586 A1 | 3/2003 | Bheemarasetti et al. |
| 2003/0046587 A1 | 3/2003 | Bheemarasetti et al. |
| 2003/0066032 A1* | 4/2003 | Ramachandran et al. .... 715/513 |
| 2003/0114442 A1 | 6/2003 | Heckel et al. |
| 2003/0156142 A1 | 8/2003 | Nonaka et al. |
| 2003/0191799 A1 | 10/2003 | Araujo et al. |
| 2003/0208529 A1 | 11/2003 | Pendyala et al. |
| 2004/0002048 A1 | 1/2004 | Thurmaier et al. |
| 2004/0049515 A1 | 3/2004 | Haff et al. |
| 2004/0070608 A1 | 4/2004 | Saka |
| 2005/0144186 A1 | 6/2005 | Hesselink et al. |
| 2005/0149481 A1 | 7/2005 | Hesselink et al. |
| 2006/0041635 A1 | 2/2006 | Alexander et al. |
| 2006/0064716 A1 | 3/2006 | Sull et al. |
| 2006/0152575 A1 | 7/2006 | Amiel et al. |
| 2006/0294307 A1 | 12/2006 | Summers et al. |
| 2007/0157100 A1 | 7/2007 | Wiggen |
| 2007/0162589 A1 | 7/2007 | Riddle |
| 2008/0313236 A1 | 12/2008 | Vijayakumar et al. |
| 2009/0030971 A1 | 1/2009 | Trivedi et al. |

OTHER PUBLICATIONS

Notice of Allowance on U.S. Appl. No. 11/941,521 dated Feb. 16, 2012.
Office Action on U.S. Appl. No. 11/941,521 dated Dec. 1, 2009.
Office Action on U.S. Appl. No. 11/941,521 dated Feb. 1, 2011.
Office Action on U.S. Appl. No. 11/941,521 dated Jul. 14, 2010.
Office Action on U.S. Appl. No. 11/941,521 dated Aug. 29, 2011.
Written Opinion for PCT Application No. PCT/US08/075543, mailed Dec. 12, 2008, 6 pages.
Notice of Allowance for U.S. Appl. No. 11/326,584 dated Jun. 22, 2010.
Office Action for U.S. Appl. No. 11/326,584 dated Jan. 22, 2008.
Office Action for U.S. Appl. No. 11/326,584 dated Nov. 10, 2008.
Office Action for U.S. Appl. No. 11/326,584 dated Dec. 30, 2009.

* cited by examiner

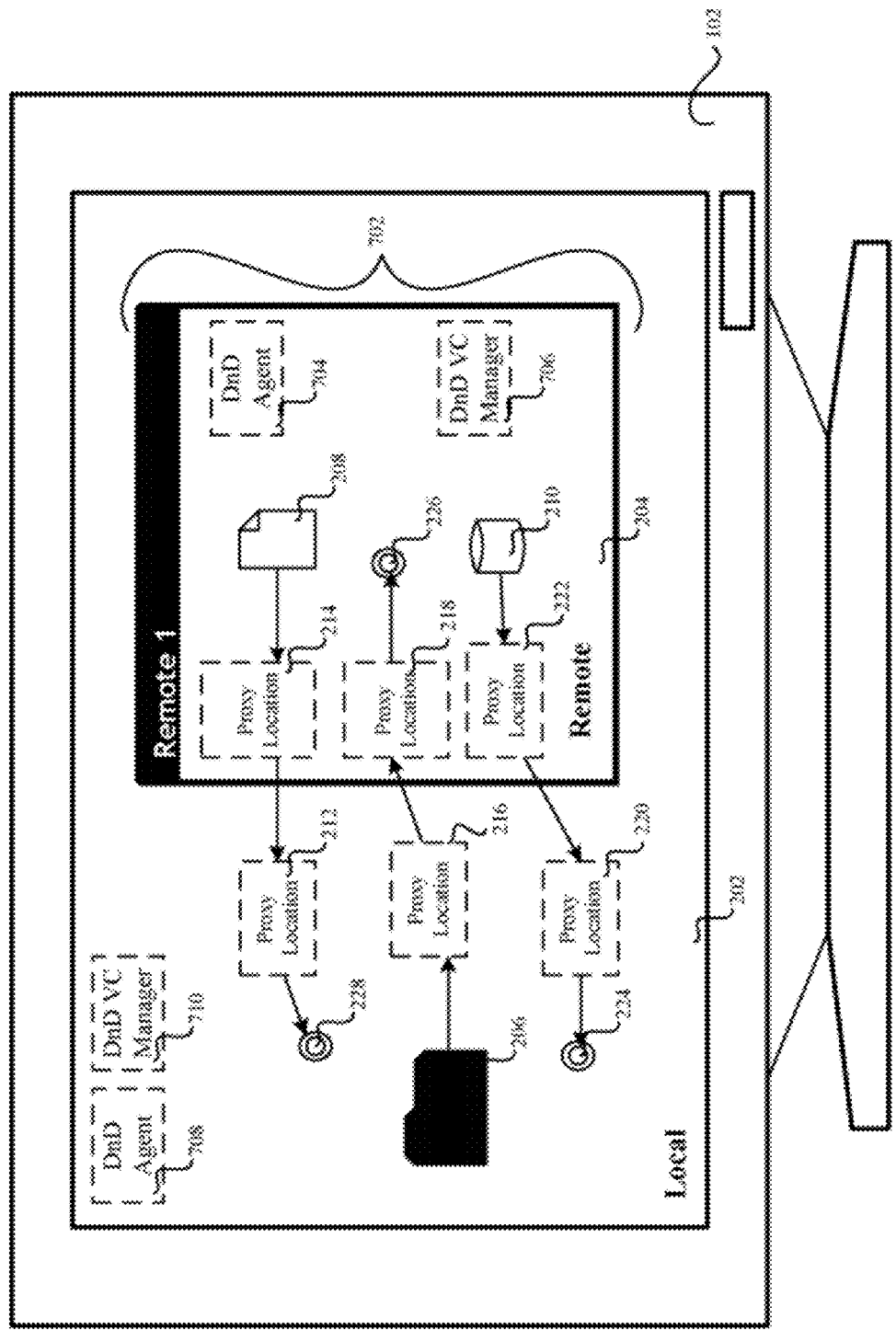

SYSTEM AND METHOD FOR TRANSFERRING DATA AMONG COMPUTING ENVIRONMENTS

RELATED APPLICATIONS

This application claims the benefit of and priority to U.S. patent application Ser. No. 11/941,521, titled "System and Method for Transferring Data Among Computing Environments," filed Nov. 16, 2007, and U.S. Provisional Patent Application No. 60/981,486, titled "System and Method for Transferring Data Among Computing Environments," filed Oct. 20, 2007, each of which are hereby incorporated in their entirety.

FIELD OF THE INVENTION

This application relates generally to transferring data. In particular, this application relates to systems and methods for transferring data among computing environments.

BACKGROUND OF THE INVENTION

Solutions used to transfer data among computing environments include those that transfer data packets one at a time, or those solutions that allow only one transfer session to execute at any one time. Further solutions include those that stop one set of transfer sessions to let another set of transfer sessions complete the transfer of data. Still other solutions include those that prioritize execution of transfer sessions, and that transfer one set of data at a time according to the established priority.

SUMMARY OF THE INVENTION

In one aspect a method for transferring data among a portion of a local computing environment and a portion of a remote computing environment, where the local computing environment communicates with the remote computing environment using a presentation layer protocol is shown. The method includes retrieving a data item that is represented by a selected object, and that is located in either the local computing environment or the remote computing environment. The method further includes initiating a first transfer cycle among the computing environments when the selected object is released in the other of either of the local computing environment or the remote computing environment. After the first transfer cycle is initiated, the selected data item transfers during the first transfer cycle and via a presentation layer protocol, from the one of either the local computing environment or the remote computing environment to the other of either the local computing environment or the remote computing environment. The method further includes retrieving a second data item that is represented by a second selected object. The second data item is located in either the local computing environment or the remote computing environment. The method further includes initiating a second transfer cycle among the computing environments when the second selected object is released in the other of either of the local computing environment or the remote computing environment. After the second transfer cycle is initiated, the second selected data item transfers during the second transfer cycle, during at least a portion of the first transfer cycle, and via the presentation layer protocol, from the one of either the local computing environment or the remote computing environment to the other of either the local computing environment or the remote computing environment.

In one embodiment, the method includes compressing the selected data item before transferring the data item from either the remote computing environment or the local computing environment to the other of either of the remote computing environment or the local computing environment.

Another embodiment of the method includes retrieving a selected data item, where the retrieved data represents a collection of data items. In one embodiment of the method, the selected data is converted into a list of the individual data item entries, and each data item entry is read. The data item entries, in this embodiment, are further representative of individual data items included within the collection of data items.

One embodiment of the method includes choosing a data operation to perform during transferring, and applying the chosen data operation to the selected data item when the release of the selected object is detected. Further embodiments include choosing a data operation where the data operation can be any one of the following: a copy operation; a move operation; a link operation; or a cancellation operation.

Still further embodiments of the method include receiving feedback data from either the local computing environment or the remote computing environment. The feedback data, in this embodiment, indicates data drop information such as: data drop permissions; data drop status; or data drop attributes.

In another aspect, a system for transferring data among a portion of a local computing environment and a portion of a remote computing environment, where the local computing environment communicates with the remote computing environment using a presentation layer protocol, is shown and described. The system includes a means for retrieving a data item that is represented by a selected object, from either of the local computing environment or the remote computing environment. The system includes a means for initiating a first transfer cycle among the computing environments when the release of the selected object in the other of either of the local computing environment and the remote computing environment is detected. The system includes a means for transferring the selected data item from one of the computing environments to the other computing environment, during the first transfer cycle and via a presentation layer protocol. The computing environments can be either the local computing environment or the remote computing environment. The system includes a means for retrieving a second data item, represented by a second selected object, the second data item located in either the local computing environment or the remote computing environment. The system has a means for initiating a second transfer cycle, during the execution of the first transfer cycle, among the computing environments. When release of the selected second data item in the other computing environment is detected, the system initiates the second transfer cycle. The system also includes a means for transferring, via the presentation layer protocol, the second selected data item from one computing environment to the other computing environment. The second selected data item transfer occurs during the second transfer cycle and during at least a portion of the first transfer cycle.

Still other aspects of the method and system include providing instructions on a computer readable medium that facilitate the method of transferring data among a portion of a local computing environment and a portion of a remote computing environment as described herein.

In still another aspect, a method for transferring data among a portion of a first remote computing environment and a portion of a second remote computing environment, where the first remote computing environment communicates with the second remote computing environment using a presentation layer protocol, is shown and described. The method includes retrieving a data item represented by a selected object, and located in a computing environment. The computing environment can be either the first remote computing environment or the second remote computing environment. The method includes initiating a first transfer cycle among the computing environments upon detection of the release of the selected object in another computing environment, where the other computing environment is either the first remote computing environment or the second remote computing environment. During the first transfer cycle and using a presentation layer protocol, the method transfers the selected data item from one computing environment to the other computing environment. The method also includes retrieving a second data item, represented by a second selected object, and located in one of the computing environments. The computing environment can be either the first remote computing environment or the second remote computing environment. When the method detects a release of the second selected object into either of the first remote computing environment or the second remote computing environment, the method responds by initiating a second transfer cycle during execution of the first transfer cycle and among the computing environments. Further included in the method is using the presentation layer protocol to transfer, during the second transfer cycle and during at least a portion of the first transfer cycle, the selected second data item from one computing environment to another computing environment.

In one embodiment, the method includes transferring during the first transfer cycle, via the presentation layer protocol, the selected data item from a remote computing environment to a local computing environment and from the local computing environment to another remote computing environment. Either of the remote computing environments can be either of the first remote computing environment and the second remote computing environment, while the other remote computing environment is the other of either of the first remote computing environment and the second remote computing environment. The method includes transferring during the second transfer cycle and during at least a portion of the first transfer cycle, via the presentation layer protocol, the selected second data item from either the first remote computing environment or the second remote computing environment to the local computing environment, and from the local computing environment to the other of either of the first remote computing environment or the second remote computing environment.

In another embodiment, the method includes choosing a data operation and applying the chosen data operation to the selected data item. Application of the chosen data operation occurs when it is detected that the selected object was released into one of the computing environments. Still another embodiment includes choosing a data operation, where the data operation can be any one of the following data operations: a copy operation; a move operation; a link operation; and a cancellation operation.

BRIEF DESCRIPTION OF THE DRAWINGS

The following figures depict illustrative embodiments of the methods and systems described herein. These figures are intended to illustrate and not limit the method and system described herein.

FIG. 3A is an illustrative diagram that depicts an embodiment of a local computing environment and a remote computing environment.

DETAILED DESCRIPTION

Figure 1A:
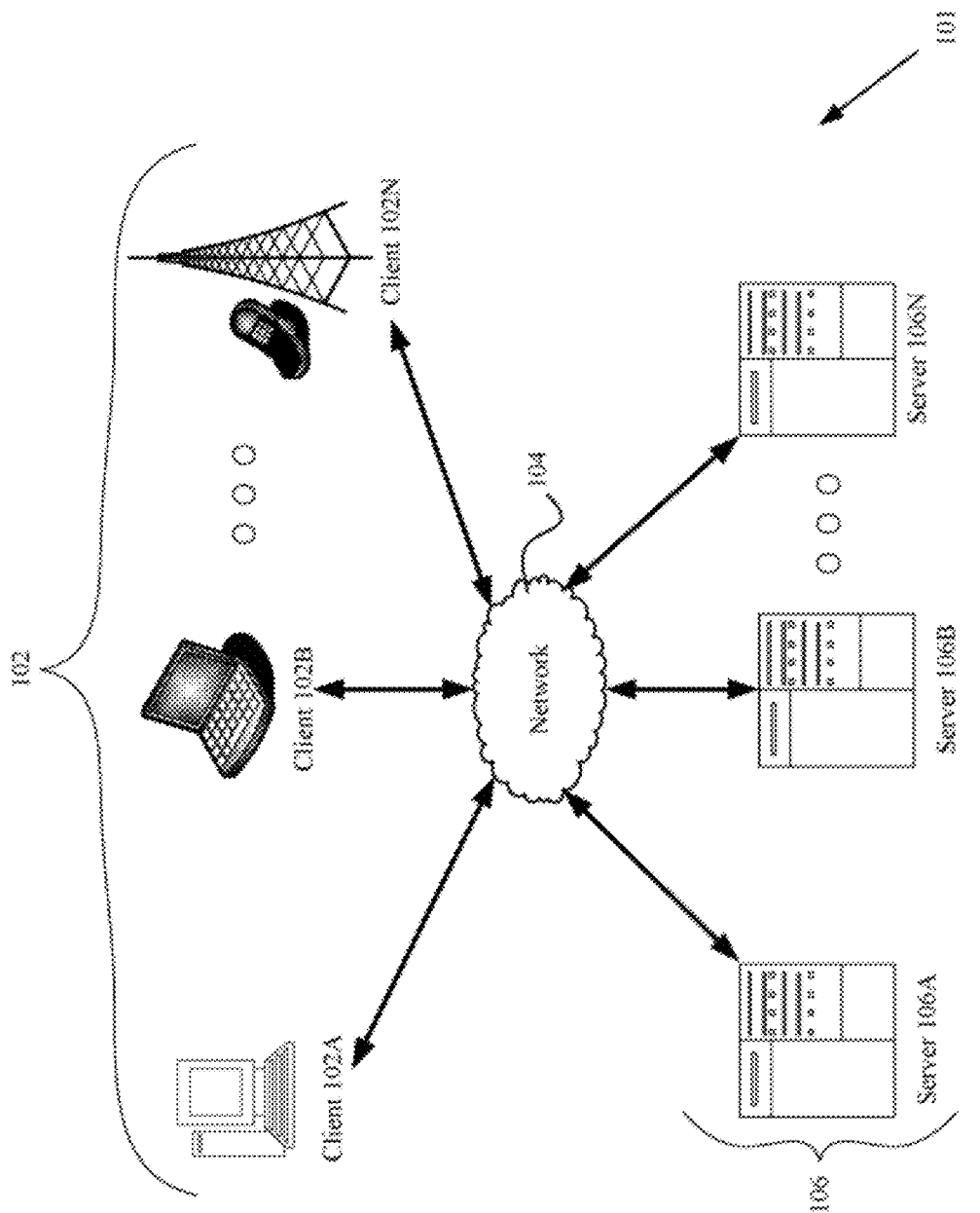
FIG. 1A is a block diagram that illustrates an embodiment of a remote-access, networked environment with a client machine that communicates with a server.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-102N may be referred to as a single client machine 102 or a single group of client machines 102, while servers 106 may be referred to as a single server 106 or a single group of servers 106. Another embodiment includes a single client machine 102 communicating with more than one server 106; another embodiment includes a single server 106 communicating with more than one client machine 102. Yet another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); client node(s); endpoint(s); endpoint node(s); second machine; or any other naming convention that denotes a second device connected to a first device such that operation of the second device is dependent in part on operations performed by the first device. The server 106 in some embodiments may be referenced by any one of the following terms: server(s), server farm(s), host computing device(s), first machine(s), or any other naming convention that denotes a first device connected to a second device, where the first device can manage, at least in part, the operation of the second device.

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active directory; a server 106 configured to operate as an acceleration application that provides firewall functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 may function, in some embodiments, as a client node seeking access to resources provided by a server 106, or as a server 106 providing other clients 102A-102N with access to hosted resources. In another embodiment, client machines 102 can also serve as a client node that seeks access to resources provided by a second client machine 102', or as a client machine 102 providing resources to a second client machine 102'. Still other embodiments may include client machines 102 that act as a server 106 for one or more client machines, and one or more servers 106. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106A-106N in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
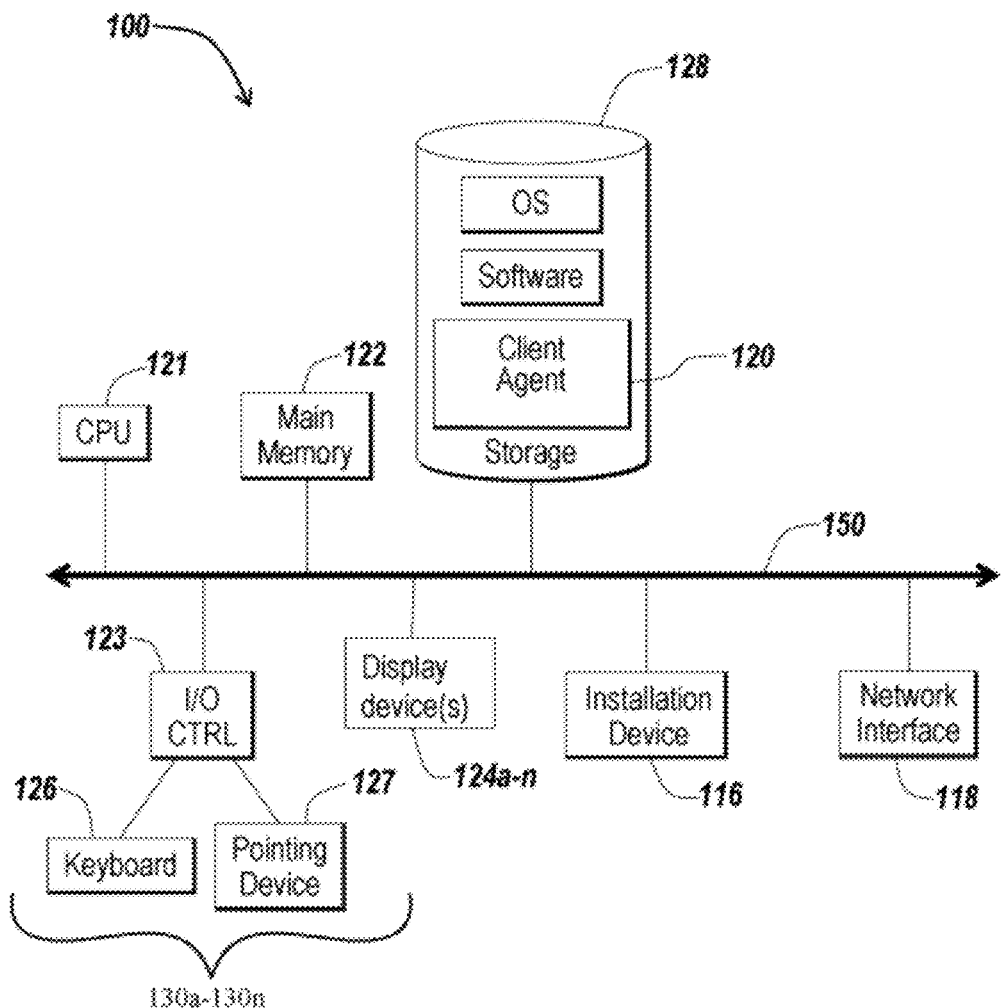
FIGS. 1B and 1C are block diagrams that illustrate an embodiment of computing machines for practicing the methods and system described herein.

Illustrated in FIG. 1B is an embodiment of a computing device 100 that can function as a client machine 102 and a server 106 illustrated in FIG. 1A. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
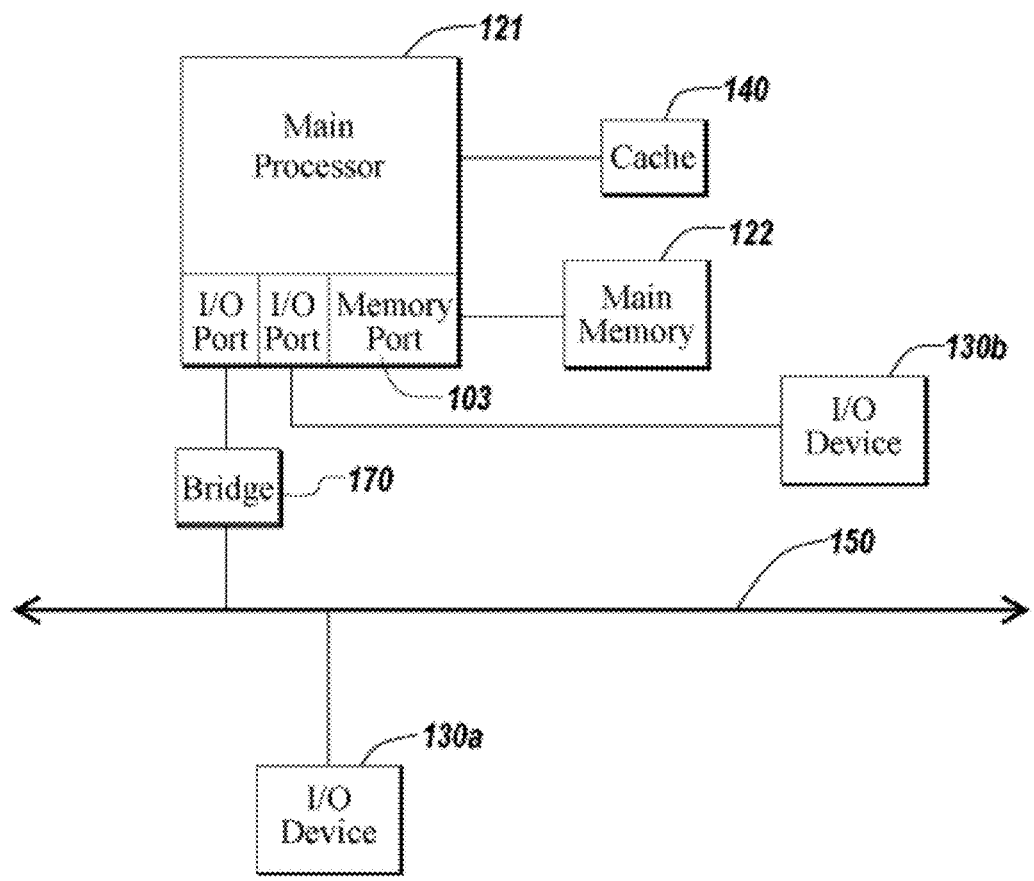

FIG. 1C illustrates an embodiment of a computing device 100, that can function as a client machine 102 and a server 106. Included within the computing device 100 is a system bus 150 that communicates with: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following form factors: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 2:
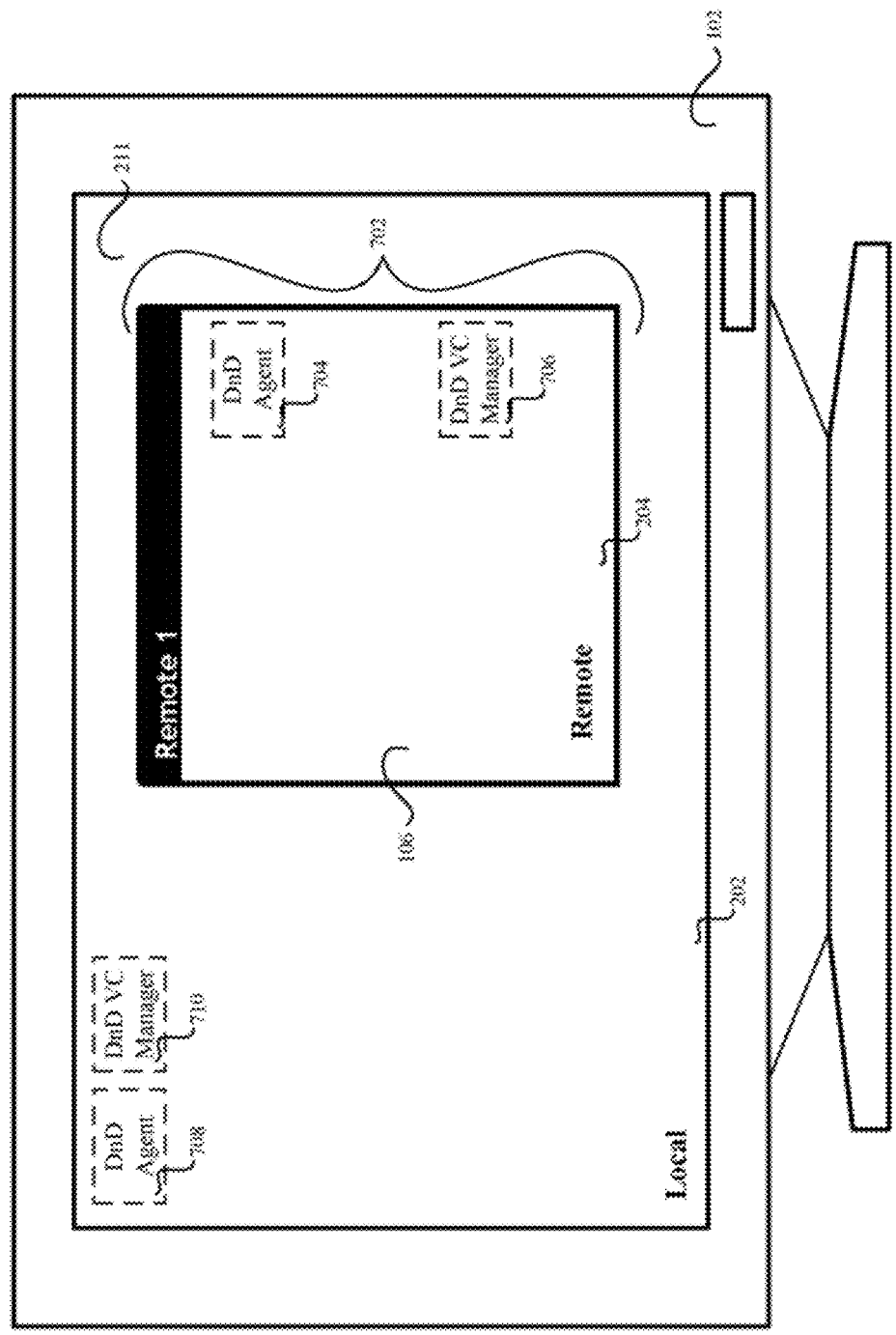
FIG. 2 is an illustrative diagram that depicts an embodiment of a first computing machine configured to access a remotely located second computing environment.

Illustrated in FIG. 2 is an embodiment of a computing environment where a client machine 102 is configured to act as a local computing environment 202, and provide access to a server 106 that acts as a remote computing environment 204. Access to the remote computing environment 204 is provided via a viewing window 702 displayed on the display screen 211 of the client machine 102. In this embodiment the client machine 102 preferably has a display screen 211 able to display a graphical viewing window 702. The viewing window 702 provides a substantially real-time graphical representation of the display screen of a remote computing environment 204. In this embodiment, the remote computing environment 204 is a server 106 that is in communication with the client machine 102. Installed on both the client machine 102 and the server 106 is a drag-and-drop (DnD) agent 708, 704, and a drag-and-drop (DnD) virtual channel (VC) manager 710, 706.

Referring to FIG. 2 in more detail, included within this embodiment is a remote computing environment 204 and a local computing environment 202. In some embodiments, the local computing environment 202 is configured to act as a source computing environment, and the remote computing environment 204 is configured to act as a destination computing environment to which data items, located in the local computing environment 202, are transferred. Data items are transferred to pre-determined drop locations within the remote computing environment 204. The local computing environment 202, in this embodiment, is a source computing environment that provides a data item to be transferred to the destination computing environment, or the remote computing environment 204. Other embodiments include a local computing environment 202 that is a destination computing environment, and remote computing environments 204 that are source computing environments. Still other embodiments include a first remote computing environment that is a source computing environment, and a second remote computing environment that is a destination computing environment. Embodiments may refer to a destination computing environment as a target computing environment.

The embodiment illustrated in FIG. 2 further includes a viewing window 702 through which the display screen in the remote computing environment may be viewed. Some embodiments include a viewing window 702 that displays a portion of a display screen, or an application window. In this embodiment, the viewing window 702 is a session window. Other embodiments may include a viewing window 702 that is a session window that populates with graphical data representative of a remote computing environment via a thin-client, remote-display protocol. The remote display protocol, is in some embodiments, a presentation layer protocol that further facilitates communication between the remote computing environment and the local computing environment. In one embodiment, a thin-client, remote display protocol can include a remote desktop protocol such as Microsoft terminal services; or in other embodiments, the remote display protocol can include the Independent Computing Architecture (ICA) protocol manufactured by Citrix. Still other embodiments of the computing environments may populate the viewing window 702 using a different remote display protocol that provides remote-access to a remotely located computing machine via the graphical display. In one embodiment, the viewing window displays a portion of the remote computing environment, and displays this portion of the remote computing environment on a portion of the local computing environment.

In one embodiment of the computing environments, the drag-and-drop (DnD) agents 708, 704 are each able to facilitate the transfer of data items among local and remote computing environments such that each drag-and-drop (DnD) agent 708, 704 tracks the context in which each transfer cycle runs. In this embodiment of the computing environments, both the source computing environment and the destination computing environment are displayed on the display screen 211 of the local computing environment 202. For example, if the local computing environment 202 is the source computing environment where the data item is located, and the remote computing environment 204 is the destination computing environment where the data item is to be transferred; then both the local computing environment 202 and the remote computing environment 204 are displayed on the display screen 211 of the local computing environment 202. In other embodiments, a method for transferring among the computing environments allows a data item in a source computing environment to be transferred to a destination computing environment such that either one of the computing environments or neither of the computing environments are displayed on the display screen 211 of the local computing environment 202. One embodiment includes drag-and-drop (DnD) agents 708, 704 that are able to transfer between remote environments when viewing windows are displayed within the local computing environment 202 that represent the remote computing environments. In this embodiment, the drag-and-drop (DnD) agents 708, 704 are able to transfer between a remote computing environment 204 and a local computing environment 202 when a viewing window is displayed within the local computing environment 202 that represents the remote computing environment 204. Still other embodiments include drag-and-drop (DnD) agents 708, 704 that are referred to as transfer agents and that can facilitate the transfer of data items between computing environments. In this embodiment, the transfer of data items is facilitated by any one of the following transfer methods: drag and drop, clipboard, or any other transfer method that can move the data item from a source computing environment to a destination computing environment.

In one embodiment of the computing environments, drag-and-drop (DnD) virtual channel (VC) managers 710, 706 are included to facilitate transferring data items among computing environments using the virtual channel (VC). Transfers, in this embodiment, take place between a source computing environment and a destination computing environment, and include transfer of a data item to a particular drop location within the destination computing environment. Drag-and-drop (DnD) virtual channel (VC) managers 710, 706, in this embodiment, interact with the presentation layer protocol stack to obtain data items from the drag-and-drop (DnD) agents 708, 704, and transfer the data items over the virtual channel (VC) to the destination computing environment. Other embodiments of the computing environments refer to drag-and-drop (DnD) virtual channel (VC) managers 710, 706 as drag-and-drop (DnD) virtual drivers. Still other embodiment include drag-and-drop virtual channel managers 710, 706 that are transfer drivers that manage the transfer of data items between a source computing environment and a destination computing environment using any one of the following transfer methods: drag-and-drop, clipboard, or any other transfer mechanism configured to transfer the data item from the source computing environment to the destination computing environment.

The viewing window 702 can, in this embodiment, either be a representation of a desktop in the remote computing environment 204, or a seamless window representative of an application executing in the remote computing environment 204. The seamless window, in this embodiment, is configured to display a graphical representation of an application executing on the server 106, where the seamless window looks substantially similar to the application window generated by an application executing on the client machine 102 and displayed on the display screen 211 of the client machine 102. In other words, the viewing window 702 is a seamless application window for an application executing locally on the server 106, but that is in a graphical format substantially similar to the format of an application window for an application executing locally on the client machine 102, and that is displayed remotely in a viewing window 702 on the client machine 102. Other embodiments may include a viewing window 702 that displays a graphical representation of a remote computing environment 204, where application windows located within the remote computing environment 204 are reverse seamless application windows. A reverse seamless application window, in this embodiment, is an application window in a remote computing environment 204 that displays a graphical representation of an application executing within the local environment, but providing a display of the application window that appears as though the application were executing locally within the remote computing environment 204. Within the reverse seamless window, an application that executes locally on the client machine 102 is integrated into the local display representative of a graphical representation of the desktop display of the remote server 106. In other words, in one embodiment, the application executing locally within the local computing environment 202, appears to execute within the remote computing environment 204. Still other embodiments of the computing environments may include a viewing window 702 that is configured to display portions of the remote computing environment 204, or to display graphical representation of the remote computing environment 204 that are configured different from that of the above configuration. In some embodiments a viewing window may be referred to as an application window.

Illustrated in FIG. 3A is one embodiment of a client machine 102 configured to display a viewing window 702 of a remote computing environment 204 on the display screen of a local computing environment 202. Included in the local computing environment 202 are the following: a drag-and-drop (DnD) agent 708; a drag-and-drop (DnD) manager 710; a target drop location 224 for a third data item 210; a proxy location 220 for a third data item 210; a proxy location 216 for a second data item 206; a proxy location 212 for a first data item 208; a second data item 206; and a target drop location 228 for a first data item 208. Included in the remote computing environment 204 are the following: a proxy location 214 for a first data item 208; a first data item 208; a proxy location 218 for a second data item 206; a target drop location 226 for a second data item 206; a proxy location 222 for a third data item 210; a third data item 210; a drag-and-drop (DnD) agent 704; and a drag-and-drop (DnD) manager 706.

Referring to the embodiment in FIG. 3A in more detail, the local computing environment 202 is a client machine 102 that communicates with a server 106 via a network 104. Other embodiments of the local computing environment 202 include a local computing environment 202 that is a server 106. In one embodiment of the local computing environment 202, the local computing environment 202 operates as a source computing environment that provides a destination computing environment with data items. Another embodiment of the local computing environment 202 includes a local computing environment 202 that operates as a destination computing environment that provides target drop locations for transferred data items. The local computing environment 202, in this embodiment, is configured to access a remote computing environment 204 via a viewing window 702. Other embodiments of the local computing environment 202 access more than one remote computing environment 204 via more than one viewing window 702.

In this embodiment, the remote computing environment 204 is a server 106 that communicates with client machine(s) 102 via a network 104. Other embodiments of the remote computing environment 204 include a remote computing environment 204 that is a client machine 102. In one embodiment of the remote computing environment 204, the remote computing environment 204 operates as a source computing environment that provides a destination computing environment with data items. Another embodiment of the remote computing environment 204 includes a remote computing environment 204 that operates as a destination computing environment that provides target drop locations for transferred data items.

Further referring to FIG. 3A, the data items 208, 210 included in the remote computing environment 204 and the data item 206 included in the local computing environment 202, are data items that, as used herein, refer to a data item that is transferable among computing environments. Examples of data items include: files 208, folders 206, and objects 210. Data items can, in some embodiments, be in any one of the following data formats: windows text or a series of single byte characters terminated by a null character; windows bitmap, windows metafile picture, windows OEM text, windows device independent bitmap, windows palette, windows Unicode text or two byte Unicode characters terminated by a null character and where lines are delimited by a carriage return; folders that include one or more files, folders that include no files; SYLK (Symbolic Link Format); DIF (data interchange format); TIFF (tagged-image file format); PENDATA (pen extensions to the Microsoft windows for pen computing); RIFF (audio data that can be represented in a CF WAVE standard wave format; WAVE (standard wave format such as 11 kHz or 22 kHz pulse code modulation; ENHMETAFILE (handle to an enhanced metafile); OWNERDISPLAY (owner-display format); DSPTEXT (text display format associated with a private format); DSPBITMAP (bitmap display format associated with a private format); DSPMETAFIL-EPICT (metafile-picture display format associated with a private format); DSPENHMETAFILE (enhanced metafile display format associated with a private format); all data formats supported by Clipboard; custom data formats; user-defined data formats; application-defined formats; or any data format able to be transferred using a drag-and-drop operation or similar transfer operation.

In one embodiment of the system, the client machine 102 provides a viewing window 702 through which a graphical representation of the remote computing environment 204 is displayed. Embodiments of viewing window 702, include a viewing window 702 configured to represent an application viewing window that displays an application executing in the remote computing environment 204. The viewing window 702 can be a seamless viewing window, a local viewing window, a viewing window of a remote desktop, or a reverse seamless application window.

Drag-and-drop (DnD) agents 704, 708 are included in the remote computing environment 204 and the local computing environment 202. In one embodiment, the drag-and-drop (DnD) agent 704 in the remote computing environment 204 creates proxy locations 214, 218, 222 in the remote computing environment 204 when data is either transferred from the remote computing environment 204 to the local computing environment 202, or when data is received from a data transfer initiated in the local computing environment 202. In this embodiment, the drag-and-drop (DnD) agent 704 destroys proxy locations 214, 218, 222 when they are no longer needed. In another embodiment of the computing environment, a drag-and-drop (DnD) agent 708 in the local computing environment 202 creates proxy locations 212, 216, 220 in the local computing environment 202 when data is either transferred from the local computing environment 202 to the remote computing environment 204, or when data is received from a data transfer initiated in the remote computing environment 204. Other embodiments transfer data directly from a source computing environment to a target drop location in a destination environment without utilizing drag-and-drop (DnD) agents, or proxy locations. In this embodiment, data items transfer directly from a source computing environment to a target drop location via an application that retrieves the data item from the source computing environment, sends the data item to an application executing in the destination computing environment and able to redirect the data item to the target drop location. Still other embodiments of the computing environments may include a drag-and-drop (DnD) agent 704, 708 configured to utilize a single proxy location as an intermediate drag or drop location before data is either transferred or received from another computing environment. One embodiment may include computing environments where the drag-and-drop (DnD) agent 704, 708 is configured to utilize a first proxy location as an intermediate drop location for data being transferred to another computing environment, and a second proxy location as an intermediate drop location for data being received from another computing environment.

Still other computing environments may include a drag-and-drop (DnD) agent 704, 708 that creates proxy locations as a drag or drop location for multiple transfer events, where the creation and sharing of a proxy location is dictated by any one of the following: a policy that dictates the creation and sharing of a proxy location, the type of data object being transferred, the type of data transfer, user-initiated commands, or other type of system input or condition that indicates that a particular proxy location should be created, or that a particular proxy location should be shared.

Drag-and-drop (DnD) virtual channel (VC) managers 706, 710 are included in the remote computing environment 204 and the local computing environment 202. In one embodiment of the computing environments, drag-and-drop (DnD) virtual channel (VC) managers 706, 710 are included to facilitate the transfer of one or more data items from a source computing environment to a target drop location 224, 226, 228 within a destination computing environment. In this embodiment, the drag-and-drop (DnD) virtual channel (VC) managers 706, 710 transfer data items using a presentation layer protocol and via a virtual channel. Other embodiments of the computing environments include a drag-and-drop (DnD) virtual channel (VC) manager 706, 710 that transfers data between computing environments using a virtual channel (VC) such as the Citrix ICA channel. Still other embodiments of the computing environments may include a drag-and-drop (DnD) virtual channel (VC) manager 706, 710 that transfers data between computing environments on a separate thread from that of the main thread. In one embodiment, the drag-and-drop virtual channel managers 706, 710 transfer data over a virtual channel and using a transfer protocol able to transfer data items from a source computing environment to a destination computing environment.

Target drop locations 226, 228, 224 are included in the remote computing environment 204 and the local computing environment 202. In one embodiment of the computing environments, the target drop locations can be file directory locations, data items, or applications executing in the destination computing environment. A target drop location, in one embodiment, is defined by the location within the display screen of the local computing environment where the selected object was released. An example would be a release of the representative object into an application. In this example, if the selected object is representative of text data, then the text data would be copied into the application. Another example would be the release of the representative object onto the desktop of the destination computing environment. In this example, if the selected object is representative of a data file, the data file would be copied into a location within the desktop folder within the file system of the destination computing environment. Other embodiments can include a proxy drop location that provides the functionality of a target drop location that is a proxy drop location, or a target drop location that provides the functionality of a proxy drop location.

Proxy locations 214, 218, 222 are included in the remote computing environment 204 and proxy locations 212, 216, 220 are included in the local computing environment 202. Proxy locations are temporary windows within the remote computing environment 204 and the local computing environment 202 that are used to transfer data items among computing environments. Embodiments can include proxy locations that are proxy drag locations, or proxy locations that are proxy drop locations. A proxy drag location, in this embodiment, is a proxy location within the source computing environment into which the data item is temporarily dragged. A proxy drop location, in this embodiment, is a proxy location within the destination environment into which the data item is temporarily dropped. Other embodiments include proxy locations that are not specifically associated with either dragging or dropping the data item. In one embodiment, drag-and-drop (DnD) agents 704, 708 create and destroy proxy locations, and use proxy locations to transfer data items among computing environments and to a target drop locations via the virtual channel. In other embodiments, the drag-and-drop (DnD) virtual channel (VC) managers 706, 710 are used to create and destroy proxy locations. When data items are transferred from the remote computing environment 204 to the local computing environment 202, a data object 208, 210 first transfers to a remote proxy drag location 214, 222 within the remote computing environment, then transfers to a local proxy drop location 212, 220 in the local computing environment 202, and then transfers to the target drop location 228, 224 in the local computing environment 202. When data objects are transferred from the local computing environment 202 to the remote computing environment 204, a data object 206 first transfers to a local proxy drag location 216 within the local computing environment 202, then transfers to a remote proxy drop location 218 in the remote computing environment 204, and then transfers to the target drop location 226 in the remote computing environment 204. Other embodiments may include proxy locations that are substantially always present within the computing environments. Proxy locations can, in one embodiment, be proxy drop locations; and in other embodiments, proxy locations are proxy drag locations. Some embodiments, where a transfer takes place between two remote computing environments, require: a first transfer to a proxy drop location in the source computing environment or the first remote computing environment; a proxy drag location in the local computing environment; a proxy drop location in the local computing environment; and a proxy drag location in the destination computing environment or the second remote computing environment.

Figure 3B:
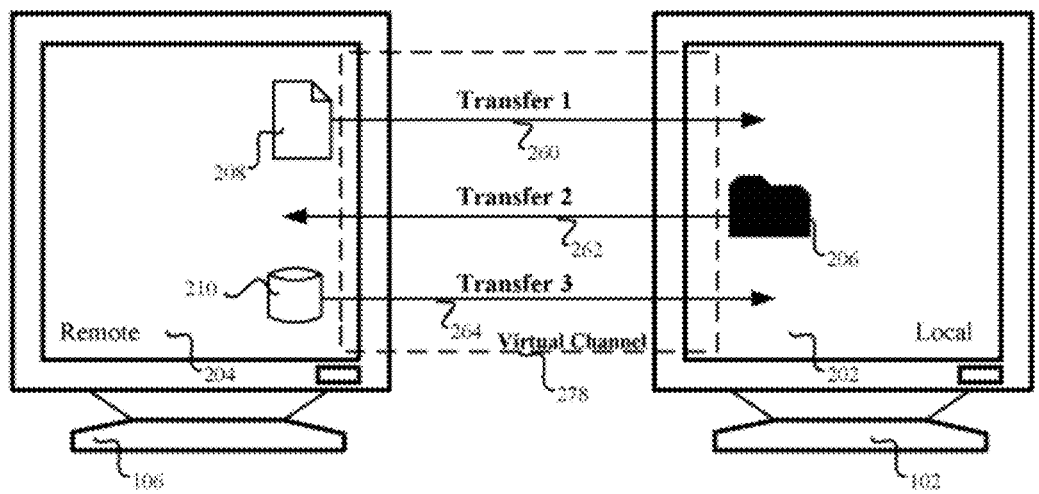
FIG. 3B is a block diagram illustrating an embodiment of a transfer of data objects between a remote computing environment and a local computing environment.

FIG. 3B is an illustration of an embodiment of computing environments able to transfer data. In this embodiment, a client machine 102 is in communication with a server 106 and installed in between the client machine 102 and server 106 is a virtual channel (VC) 278. The client machine 102 communicates with the server 106 such that the client machine 102 is a local computing environment 202 that accesses the server 106, which is a remote computing environment 204. Data items 206 in the local computing environment 202 and data items 208, 210 in the remote computing environment 204 are transferred, in this embodiment, during transfer cycles 260, 262, 264 and via the virtual channel (VC) 278.

Referring to FIG. 3B in more detail, in one embodiment, the local computing environment 202 is a client machine 102. In other embodiments, the local computing environment 202 is a server 106. Other embodiments of the computing environments include a local computing environment 202 that provides access to a remote computing environment 204 via a viewing window displayed within the local computing environment 202, and a viewing window representative of the display screen in the remote computing environment 204. In one embodiment the display screen is an application window, while in other embodiments the display screen is a portion of a display screen. Still another embodiment includes a first client machine 102 that is a local computing environment 202, and a second client machine 102' that is a remote computing environment 204.

The virtual channel (VC) 278 located between the local computing environment 202 and the remote computing environment 204 is a virtual channel (VC) able to transfer data items among the computing environments. One embodiment includes a virtual channel that uses a remote transfer protocol such as those described herein. Other embodiments include a virtual channel (VC) that does not use a presentation layer protocol, and is located between the computing environments and is configured to transfer data among computing environments. Other embodiments of the computing environments include transfers amongst computing environments where a portion of the transfers utilize the virtual channel (VC) 278, and a portion of the transfers use a virtual channel (VC) that does not use a presentation layer protocol.

Data items 206, 208, 210 that may be transferred amongst the computing environments including files 208, folders 206, and objects 210, or any other data type described herein.

Figure 3C:
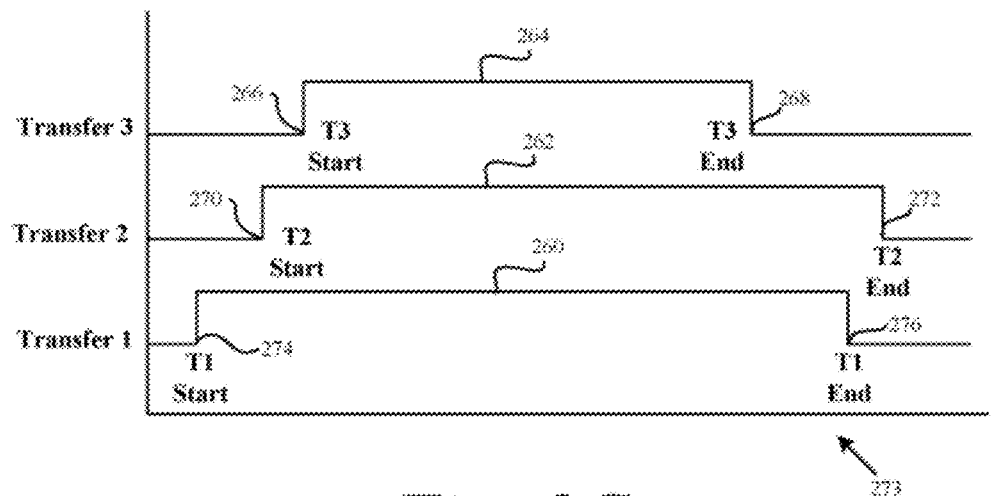
FIG. 3C is a graph that illustrates an embodiment of a plurality of transfer cycles.

Each data item, in one embodiment, transfers among computing environments during a respective transfer cycle 260, 262, 264. A first data item 208 transfers from the remote computing environment 204 to the local computing environment 202 using the virtual channel (VC) 278 and during a first transfer cycle 260. A second data item 206 transfers from the local computing environment 202 to the remote computing environment 204 via the virtual channel (VC) 278 and during a second transfer cycle 262. A third data item 210 uses the virtual channel (VC) 278 to transfer from the remote computing environment 204 to the local computing environment 202 during a third transfer cycle 264. Other embodiments of the computing environments include a first, second and third data item 208, 206, 210 that transfer during anyone of the following: a common transfer cycle; a first transfer cycle that includes all data items moving from the remote computing environment 204 to the local computing environment 202, and a second transfer cycle that includes all data items moving from the local computing environment 202 to the remote computing environment 204; a transfer cycle common among data types; a transfer cycle delayed by a period of time corresponding to the transfer cycles order of priority within a listing of transfer cycles that is prioritized according to the point in time during which each transfer cycle was initiated; or any combination of the above types of transfer cycle Illustrated in FIG. 3C is an embodiment of a graph 273 of the transfer cycles 260, 262, 264 illustrated in FIG. 3B. The graph in this embodiment compares the points in time during each of the illustrated transfer cycles 260, 262, 264. The first transfer cycle 260 commences at a time "T1 Start" 274 and ends at a time "T1 End" 276. The duration of the first transfer cycle 260 can be determined by analyzing the lapse in time from the "T1 Start" 274 point in time to the "T1 End" 276 point in time. In this embodiment, the second transfer cycle 262 commences at a time "T2 Start" 270 and ends at a time "T2 End" 272. The duration of the second transfer cycle 262 can be determined by analyzing the lapse in time from the "T2 Start" 270 point in time to the "T2 End" 272 point in time. The third transfer cycle 264 commences at a time "T3 Start" 266 and ends at a time "T3 End" 268. The duration of the third transfer cycle 264 can be determined by analyzing the lapse in time from the "T3 Start" 266 point in time to the "T3 End" 268 point in time.

Further referring to FIG. 3C in more detail, one embodiment of a graph representative of the transfer cycles 260, 262, 264 includes a first transfer cycle that starts at a point in time "T1 Start" 274 and ends at a point in time "T1 End" 276. In this embodiment the "T1 Start" 274 point in time is characterized as the point in time during which a selected data object is released into its destination environment. For example, if a mouse were used to select a data object located in a local computing environment 202 and the mouse cursor were moved into a remote environment 204 such that a data object was also moved into the remote computing environment 204; the point in time when the mouse button is released while the mouse cursor and the data object are visually located on the display screen in the remote computing environment 204, is the point in time corresponding to "T1 Start" 274. The "T1 End" 276 point of time, in this embodiment, is the point in time when the data object has fully transferred from the source computing environment to the destination computing environment. In the above example, the "T1 End" 276 point in time would be the point in time when the data item represented by the data object, has fully transferred to the remote computing environment 204. The duration of time of the transfer cycle 260, in this embodiment, is substantially characteristic of the duration of time necessary to transfer the data item from the source computing environment to the destination computing environment. Embodiments of the transfer cycle 260 can be characterized by a time duration corresponding to the time necessary to transfer the data item from the source computing environment to the destination computing environment, the amount of time needed to initiate the data item transfer once the mouse button is released, and transfer delays. Other embodiments of the first transfer cycle 260 include a "T1 Start" 274 point in time representative of the point in time when the data item begins the transfer from the source computing environment to the destination computing environment.

In one embodiment of the transfer cycles 260, 262, 264, the second transfer cycle 262 commences at a point in time "T2 Start" 270 and ends at a point in time "T2 End" 272. The point in time "T2 Start" 270 is, in this embodiment, a point in time later than the point in time "T1 Start" 274 when the first transfer cycle 260 commences, and a point in time before the time "T1 End" 276 when the first transfer cycle 260 ends. In this embodiment, the second transfer cycle 262, at least for a portion of time, transfers the second data item 206 while the first transfer cycle 260 transfers the first data item 208. The second transfer cycle 262, in this embodiment, ends at a point in time "T2 End" 272 that is a later point in time than the time when the first transfer cycle 260 ends, "T1 End" 276. While the second transfer cycle 262 begins transferring the second data item 206 during the duration of the first transfer cycle 260; the first transfer cycle 260 finishes transferring the first data item 208 before the second transfer cycle 262 ends. Other embodiments of the second transfer cycle 262 may include a start time "T2 Start" 270 that includes: a point in time before the "T1 End" 272 time; a point in time before the "T3 Start" 266 time; a point in time before the "T3 End" 268 time; a point in time after the "T1 End" 276 time; a point in time after the "T3 Start" 266 time; or a point in time after the "T3 End" 268 time. Still other embodiments of the second transfer cycle 262 may include an end time "T2 End" 272 that includes: a point in time before the "T1 Start" 274 time; a point in time before the "T1 End" 272 time; a point in time before the "T3 Start" 266 time; a point in time before the "T3 End" 268 time; a point in time after the "T1 Start" 274 time; a point in time after the "T3 Start" 266 time; or a point in time after the "T3 End" 268 time.

The third transfer cycle 264, in the embodiment illustrated in FIG. 3C, starts at a point in time "T3 Start" 266 and ends at a point in time "T3 End" 268. In this embodiment, the "T3 Start" 266 time occurs after the "T1 Start" 274 time, and after the "T2 Start" 270 time; while the "T3 End" 268 time occurs before the "T1 End" 276 time, and before the "T2 End" 272 time. While the first transfer cycle 260 transfers the first data item 208 and the second transfer cycle 262 transfers the second data item 206, the third transfer cycle 264 begins transferring the third data item 264. In this embodiment, the third transfer cycle 264 transfers the third data item 264 during at least a portion of the first transfer cycle 260 and the second transfer cycle 262. The third transfer cycle 264, in this embodiment, ends at a point in time "T3 End" 268 that is an earlier point in time than the time when the first transfer cycle 260 ends, "T1 End" 276, and at an earlier point in time than the time when the second transfer cycle 262 ends, "T2 End" 272. While the third transfer cycle 264 begins transferring the third data item 210 during the duration of the first transfer cycle 260 and the second transfer cycle 262, each of the first transfer cycle 260 and the second transfer cycle 262 finishes transferring their respective data items 208, 206 after the third transfer cycle 264 ends. This means that, in this embodiment, there exists a portion in time, after the "T3 Start" 266 time and before the "T3 End" 268 time, during which each of the first transfer cycle 260, the second transfer cycle 262, and the third transfer cycle 264 simultaneously transfer their respective data items 208, 206, 210. Other embodiments of the third transfer cycle 264 may include a start time "T3 Start" 266 that includes: a point in time before the "T1 Start" 274 time; a point in time after the "T1 End" 272 time; a point in time before the "T2 Start" 270 time; and a point in time after the "T2 End" 272 time. Still other embodiments of the second transfer cycle 262 may include an end time "T2 End" 272 that includes: a point in time before the "T1 Start" 274 time; a point in time after the "T1 End" 272 time; a point in time before the "T2 Start" 270 time; and a point in time after the "T2 End" 272 time.

Figure 4:
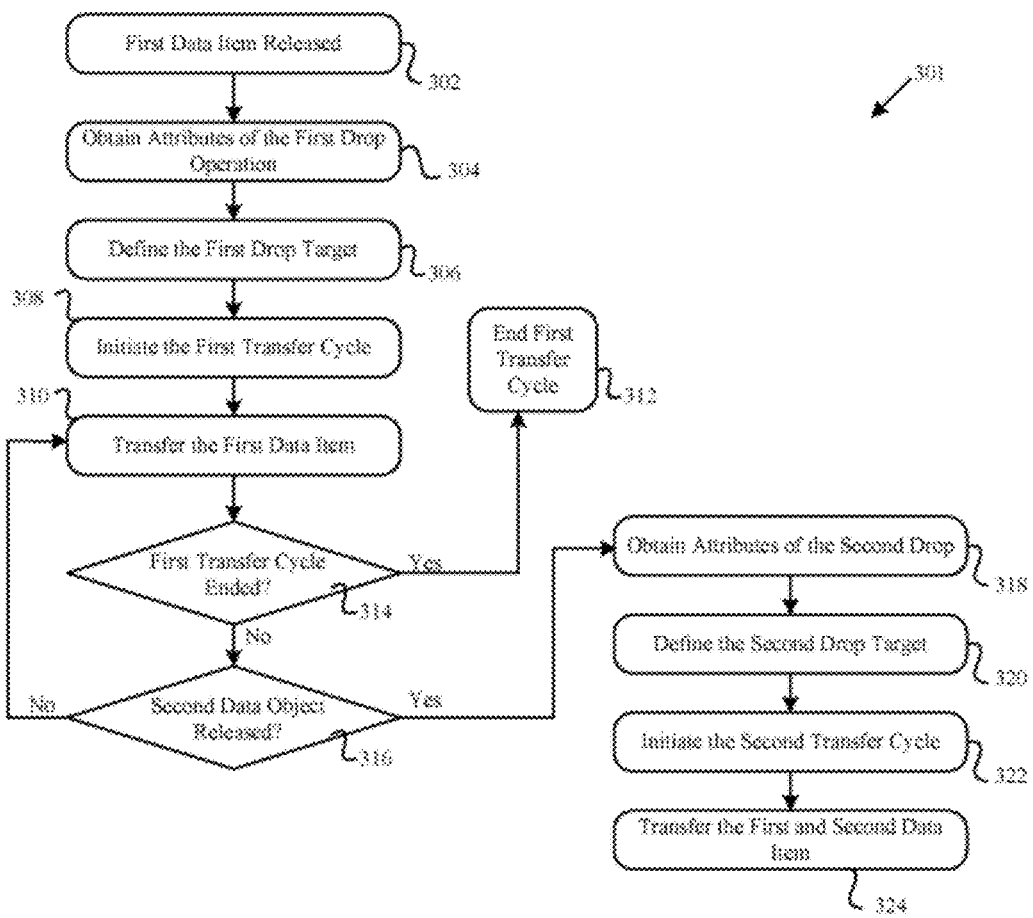
FIG. 4 is a flow diagram illustrating an embodiment of a data transfer method.

Illustrated in FIG. 4 is one embodiment of a method 301 for transferring data among computing environments. The method 301 detects when the first data object is released into one of the computing environments (step 302) and obtains the attributes of the drop operation (step 304). The drop attributes are used to define the first drop target (step 306) within the destination computing environment (step 308). In this embodiment, a first transfer cycle is initiated (step 308), and a first data item is transferred during the first transfer cycle (step 310). The method 301 performs a determination, during the transfer of the first data item (step 310), as to whether or not the first transfer cycle ended (314). When a determination is made that the first transfer cycle has finished transferring data from one computing environment to the other computing environment (step 314), the first transfer cycle ends (step 312). When a determination is made that the first transfer cycle has not finished transferring the first data object, a determination is then made as to whether on not a second data object is released into one of the computing environments (step 316). If a second data object was not released into either of the computing environments, then the first data object continues to transfer (step 310). If a second data object is released into either of the computing environments (step 316), then the attributes of the second drop are obtained (step 318) and a second drop target is defined (step 320). A second transfer cycle is initiated (step 322) and both the first data item and the second data item transfer from their respective source computing environments to their respective destination computing environments (step 324).

Further referring to FIG. 4, in one embodiment of the method 301, detection of the release of the data object in the destination computing environment (step 302) occurs when the user drags a selected object from the source computing environment to the destination computing environment and releases a mouse button. The source computing environment is the computing environment where the selected object is located. In this embodiment, the selected object is a graphical representation of a data item. Other embodiments may detect a release of the object when a button is depressed or released on another input device within either the local or remote computing environment. Exemplary input devices include: a mouse; a keyboard; a pointer; touch screen input signals; or any other input device able to select a graphical object and alter the graphical objects position within a computing environment. Embodiments of the method 301 include detecting a release of the selected object when the object is moved from a source computing environment to a destination computing environment, where the source computing environment and the destination computing environment can be anyone of the following combinations: a first remote computing environment 204 and a remote computing environment 202; a first remote computing environment 204 and a second remote computing environment 240; a second remote computing environment 240 and a first remote computing environment 204; a second remote computing environment 240 and a local remote computing environment 202; a first remote computing environment 204 and a local remote computing environment 202; or any combination of the above described source and destination computing environment combinations.

Obtaining attributes of the drop operation (step 304), in this embodiment, includes obtaining information regarding the source computing environment, the destination computing environment, and drop target. In one embodiment, computing environment information includes location permissions, target drop location data size restrictions, or network information. Still other embodiments of computing environment information can include any one of the following: file directory location information; machine address information; machine name information; network information; file extension information; data drop permissions; the location of the target drop location; restrictions on data item size; or any other type of information pertinent to transferring the data item from the source computing environment to the destination computing environment. In one embodiment of the method 301, attributes of the drop operation include the size and type of data item. Still other embodiments of the method 301 include attributes of the drop operation that include the following: the type of data operation to be performed; where the data operation can be any one of the above described data operations; whether or not the destination environment supports that data type or format that the source is advertising to transfer; and whether or not the destination environment is able to render the data item and incorporate the data item into itself.

In one embodiment of the method 301, the drop target is defined (step 306) using information obtained regarding the attributes of the drop operation. Attribute information used includes: the type of drop target; the location of the drop target within the destination environment; or the data operation. One embodiment of the method 301 retrieves drop target information when the drop target is defined (step 306). Still other embodiments relay back to the drag-and-drop (DnD) virtual channel (VC) manager in the source computing environment information regarding the location and type of location of the drop target. The drop target, in some embodiments, can be a file system location. Other embodiments include a drop target that is a data item. One example of a drop target in a file location is a drop target in the desktop of the destination environment. Transferring to the desktop means that the selected data in the source computing environment transfers to a location in the file system of the destination computing environment corresponding to the desktop of the destination computing environment. One example of a drop target in a data item is a drop target in an application. Transferring to an application in the destination computing environment means that the selected data item in the source computing environment transfers to a data location within the application that is executing within the destination computing environment. Embodiments can include any of the following types of drop target locations: applications, file systems, and system objects.

The method 301, in this embodiment, initiates the first transfer cycle by setting up the parameters of the first transfer cycle (step 308). Parameters of a transfer cycle can, in one embodiment, include information regarding whether or not the data item should be split into smaller data packets, and further could include information about the header files that should be included in the data packets, or the size of the data packets. Still other embodiments include transfer cycle parameters that detail the location of the drop target location and the location of the data item within the source computing environment. Embodiments may further include transfer cycle parameters that include any drop operation information that may be retrieved when the attributes of the drop operation are obtained (step 304). In one embodiment of the method 301, the first transfer cycle is initiated by a drag-and-drop (DnD) agent in the source computing environment; while in another embodiment of the method 301, the first transfer cycle is initiated by a drag-and-drop (DnD) virtual channel (VC) manager in the source computing environment. Other embodiments of the method 301 may initiate a transfer cycle using either a drag-and-drop (DnD) agent in the destination computing environment, or a drag-and-drop (DnD) virtual channel (VC) manager in the destination computing environment. In some embodiments, initiation of a transfer cycle includes retrieving the data item from the source computing environment, where the data item is represented by an object. This object, in some embodiments, can include a virtual object, graphical icon, or other visual representation of the selected and retrieved data item. Still further embodiments include an initialization of a transfer cycle that occurs in response to the detection by a virtual channel manager, drag-and-drop agent or other application able to determine that a selected object representative of a data item was released into a destination computing environment. In this embodiment, the release of the object representative of a retrieved data item, causes an initialization of a transfer cycle.

In one embodiment of the method 301, the first data item is then transferred to the first drop target during the first transfer cycle (step 310). Transfer of the first data item is, in one embodiment of the method 301, carried out by the drag-and-drop (DnD) virtual channel (VC) managers in the source computing environment and the destination computing environment. Other embodiments may include a method 301 where the data item transfer is carried out by one or multiple drag-and-drop (DnD) virtual channel (VC) manager(s), one or multiple drag-and-drop (DnD) agent(s), or another virtual driver or object able to transfer the data item from the source computing environment to the destination computing environment. In one embodiment of the method 301, the data item is transferred from a source computing environment and to a destination computing environment using a presentation layer protocol. Other embodiments may transfer the data item using the virtual channel (VC) and on the same single thread used to transfer the graphics information used to generate an image of the remote computing environment. Still other embodiments may transfer the data item using the virtual channel (VC), but using a separate thread than the one used to transfer graphics information used to generate an image of the remote computing environment. In another embodiment of the method 301, the drag-and-drop (DnD) virtual channel (VC) manager in the destination computing environment receives payloads that include data item information from the source computing environment, and further transfers the payloads to the drag-and-drop (DnD) agents in the destination computing environment. The drag-and-drop (DnD) agents are configured to aggregate the received payloads and transfer the data item to the appropriate target drop location in the destination computing environment. The transfer of a data item can mean any movement, linking or copying of data from a start point in one computing environment, to an end point in another computing environment. Still further embodiments include a transfer of the data from a portion of a remote computing environment to a portion of a local computing environment, or a transfer of the data from a portion of the local computing environment to a portion of the remote computing environment. Other embodiments include a transfer of the data from a portion of a first remote computing environment to a portion of a second remote computing environment, or a transfer of the data from a portion of the second remote computing environment to a portion of the first remote computing environment. When data is transferred amongst remote computing environments, a local computing environment, in some embodiments, is used as an intermediate drop and drag location to further facilitate the transfer of data.

In one embodiment of the method 301, during the transfer of the first data object (step 310), a periodic determination is made as to whether or not the first transfer cycle is complete, and when the first transfer cycle is complete, the first transfer cycle is ended (step 312). The periodic determination, in some embodiments, is made at pre-determine time intervals during the data item transfer. Other embodiments make the determination after each data packet is transferred from the source computing environment to the destination computing environment. Still other embodiments of the method 301 make the determination when an event occurs that interrupts the transfer of the data item. One example of an interruption would include the detection of a release of an additional object in either a local or remote computing environment. In one embodiment of the method 301, the first transfer cycle does not end when a determination is made that the first transfer cycle is complete (step 314), but is rather reused each time a transfer cycle is initiated with substantially similar parameters as the first transfer cycle.

The method 301, in one embodiment, further determines periodically whether or not a second data object has been released into either of the local or remote computing environments (step 316). This periodic determination can be made according to a pre-determined time schedule, after the transfer of each data packet, or when a drag-and-drop (DnD) agent, a drag-and-drop (DnD) virtual channel (VC) manager, or other application or virtual object detects a release of a second data object in either a local or remote computing environment. The release of a second data item occurs when any one of the above input devices generates user-input data indicative of the release of a second data object in a destination computing environment. As described above, the source computing environment and destination computing environment can be any combination of a local computing environment and a remote computing environment. In one embodiment of the method 301, the first transfer cycle continues to transfer while the determination is made as to whether or not a second data object was released (step 316). Another embodiment of the method 301 momentarily stops the first transfer cycle while the determination (step 316) is made. When the determination made (step 316), the first transfer cycle resumes transferring the first data item.

In this embodiment of the method 301, when the release of a second data object is not detected, the first transfer cycle continues to transfer (step 310), and when the release of a second data object is detected, attributes of the second drop (step 318) are obtained. The second drop attributes can be any combination of the drop attributes described herein.

The second drop target is defined (step 320), in this embodiment, using the drop attributes obtained (step 318). Other embodiments may utilize different drop information to define the drop target, such as the above examples of drop information. In one embodiment, the second drop target is located in a computing environment different from that of the computing environment where the first drop target is located. Other embodiments of the method 301 have a second drop target located in the same computing environment as the computing environment where the first drop target is located.

A second transfer cycle is initiated (step 322), in this embodiment of the method 301, by defining the parameters of the second transfer cycle. In one embodiment, the second transfer cycle is initiated using information obtained about the attributes of the drop operation. Other embodiments of the second transfer cycle may include any combination of transfer cycle parameters or attributes described herein.

The first and second data item are, in one embodiment of the method 301, transferred from their respective source computing environments to their respective destination computing environments (step 324). In one embodiment, the first transfer cycle and the second transfer cycle transfer over a common thread in the virtual channel (VC). Another embodiment of the method 301 include a first transfer cycle that transfer over a different thread in the virtual channel (VC) than the thread in the virtual channel over which the second transfer cycle transfers the second data item. Still other embodiments of the method 301 include a second transfer cycle that transfers the second data object during at least a portion of the first transfer cycle. In one embodiment, the first transfer cycle momentarily stops transferring while the second transfer cycle initiates (step 322), while in other embodiments first transfer cycle continues to transfer while the second transfer cycle initiates.

In one embodiment of the method 301, the transfer of the first data item and the second data item (step 324) occurs in a round-robin method of resource allocation. This means that the first data item and the second data item are transferred in pieces over the virtual channel such that the transfer alternates between transferring a piece of the first data item and a piece of the second data item. In other embodiments of the method 301, the data items may be separated into packets and the data item packets will be transferred in an alternating fashion until each packet is transferred to a destination computing environment. This embodiment of the method 301 allows the parallel transfer of the first data item and the second data item without disproportionately reducing the amount of virtual channel (VC) bandwidth available to the first and second transfer cycle. In other words, each transfer cycle is given equal access to the virtual channel (VC) to transfer data items.

Figure 5A:
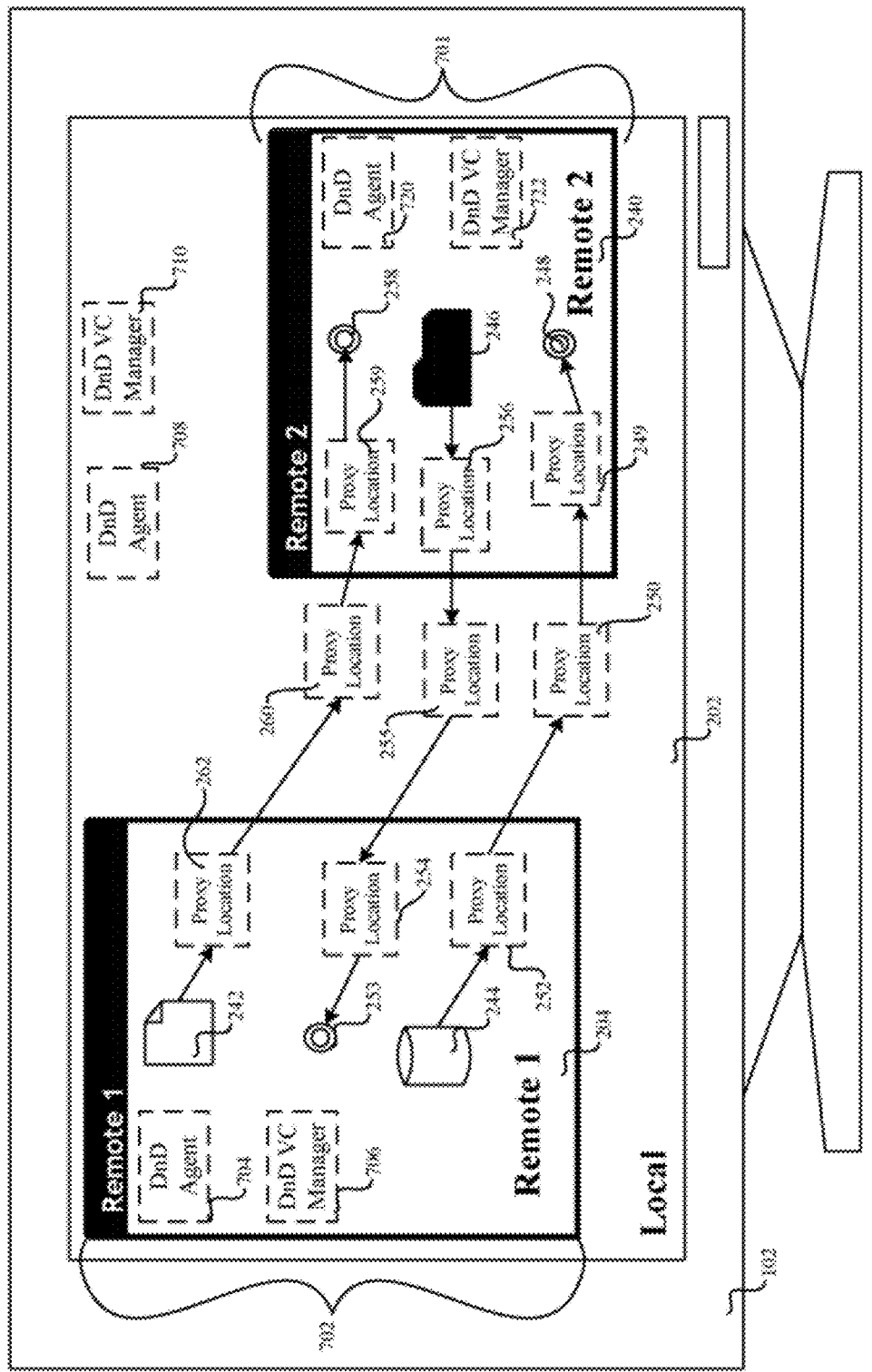
FIG. 5A is an illustrative diagram that depicts an embodiment of a local computing environment and more than one remote computing environment.

Illustrated in FIG. 5A is one embodiment of a client machine 102 configured to display multiple viewing windows 702, 701 of more than one remote computing environments 204, 240 on the display screen of a local computing environment 202. Included in the local computing environment 202 are a drag-and-drop (DnD) agent 708, a drag-and-drop (DnD) manager 710, and proxy locations 250, 255, 260. Included in the first remote computing environment 204 are: a drag-and-drop (DnD) agent 704; a drag-and-drop (DnD) manager 706; proxy locations 262, 254, 252; data items 242, 244; and a target drop location 253. Included in the second remote computing environment 240 are: a drag-and-drop (DnD) agent 720; a drag-and-drop (DnD) manager 722; proxy locations 259, 256, 249; a data item 246; and target drop locations 258, 248.

Further referring to FIG. 5A in more detail, embodiments of the computing environments can include any combination of client machine 102, servers 106 and network 104. In other embodiments, the client machine 102 can embody any type or configuration of client machine 102, and the server 106 can embody any type or configuration of server(s) 106. Still other embodiments can include a client machine 102 configured to act as a server 106.

In one embodiment of the computing environments, the local computing environment 202 is a client 102 communicating with one or more remote servers 106, 106' via the viewing window 702, 701. In this embodiment, the first remote computing environment 204 is a server 106, and the second remote computing environment 240 is a server 106'. Another embodiment of the computing environments includes a local computing environment 202 on a server 106 communicating with one or more remote client machines 102, 102' via the viewing window 702, 701. In this embodiment, the first remote computing environment 204 is a client machine 102, and the second remote computing environment 240 is a client machine 102'. Still other embodiments of the computing environments include any one of the following combinations: a local computing environment 202 that is a server 106, a first computing environment 204 that is a client machine 102, and a second computing environment 240 that is a server 106; a local computing environment 202 that is a client machine 102, and first and second remote computing environments 204, 240 that are client machines 102', 102"; a local computing environment 202 that is a client machine 102, a first remote computing environment 204 that is a server 106, and a second remote computing environment 240 that is a client machine 102; and any combination of the preceding combinations. Another embodiment of the computing environments includes a local computing environment 202 on a first client machine 102 connected to a server 106 and communicating with a second remote client machine 102' via the viewing window 702. In this embodiment, the second remote computing environment 102' can be either of the remote computing environments 204, 240 and can in some embodiments communicate with the server 106.

One embodiment of the computing environments includes drag-and-drop (DnD) agents 704, 708, 720 and drag-and-drop (DnD) virtual channel (VC) managers 706, 710, 722 in each of the included environments. Embodiments of the drag-and-drop (DnD) virtual channel (VC) managers and the drag-and-drop (DnD) agents include those described herein.

In one embodiment of the computing environments, data items 242, 244, 246 include any data item described herein.

Target drop locations 253, 258, 248 are included in each of the computing environments, and in one embodiment, serve as destination points for transferred data. In one embodiment, a target drop location is located in a destination computing environment. Other embodiments of a target drop location include those described herein.

Proxy locations are, in one embodiment, temporary drop or drag locations depending on whether the location is within a source computing environment, a destination computing environment, or an intermediary computing environment. In one embodiment, the proxy locations are used by the drag-and-drop (DnD) agents 704, 708, 720 to transfer data items amongst the computing environments. In other embodiments, the proxy locations include any combination of those described herein.

Data, in this embodiment, can include any data object able to be transferred among computing environments including: files 242, folders 246, and objects 244. When data objects are transferred from the first remote computing environment 204 to the second remote computing environment 240, a data object 242, 244 first transfers to a remote proxy location 262, 252 within the first remote computing environment 204, then transfers to a local proxy location 260, 250 in the local computing environment 202, then transfers to a remote proxy location 259, 249 in the second remote computing environment 240, and then transfers to the target drop location 258, 248 in the second remote computing environment 240. When data objects are transferred from the second remote computing environment 240 to the first remote computing environment 204, a data object 246 first transfers to a remote proxy location 256 within the second computing environment 240, then transfers to a local proxy location 255 within the local computing environment 202, then transfers to a remote proxy location 254 within the first remote computing environment 204, and then transfers to the target drop location 253 in the first remote computing environment 204. Transfer in this embodiment can mean any movement, linking or copying of data from a start point in one computing environment, to an end point in another computing environment.

Figure 5B:
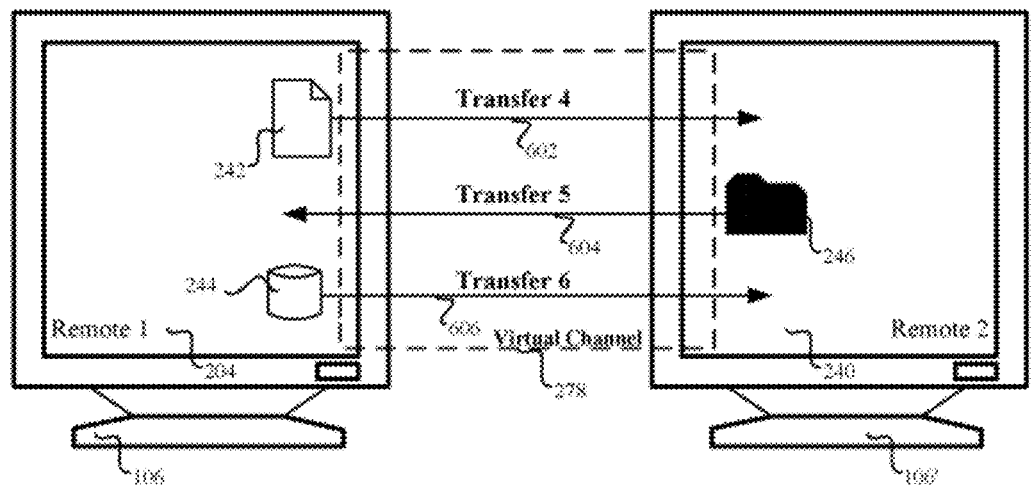
FIG. 5B is a block diagram illustrating an embodiment of a transfer of data objects between a remote computing environment and a remote computing environment.

FIG. 5B is an illustration of an embodiment of computing environments able to transfer data. In this embodiment, a first server 106 is in communication with a second server 106' via a client machine 102. Located between the client machine 102 and the servers 106, 106' is a virtual channel (VC) 278. The first server 106 communicates with the second server 106' such that the first server 106 is a first remote computing environment 204 that accesses the second server 106', which is a second remote computing environment 240, via a local computing environment 202 and remote access viewing windows 702, 701. Data objects 246 in the second remote computing environment 240 and data objects 242, 244 in the first remote computing environment 204 are transferred, in this embodiment, during transfer cycles 602, 604, 606 and via the virtual channel (VC) 278.

Referring to FIG. 5B in more detail, in one embodiment, the computing environments may include any combination of client machine(s) 102, server(s) 106, local computing environment 202, and remote computing environment(s) 204, 240. Other embodiments of the computing environments include a local computing environment 202 that provides access to a first remote computing environment 204, and a second remote computing environment 240 via viewing windows 702, 701 displayed within the local computing environment 202, and viewing windows 702, 701 representative of the display screen in the first and second remote computing environments 204, 240. Still other embodiments may include a server 106 that is a local computing environment 202, and client machines 102, 102' that are remote computing environments 204, 240.

In one embodiment, data items 242, 244, 246 that may be transferred amongst computing environments include any combination of data items described herein.

Each data item in the embodiment depicted in FIG. 5B, transfers among computing environments during a transfer cycle 602, 604, 606 and via the virtual channel (VC) 278. A fourth data object 242 transfers from the first remote computing environment 204 to the second remote computing environment 240 using the virtual channel (VC) 278 and during a fourth transfer cycle 602. A fifth data object 246 transfers from the second remote computing environment 240 to the first remote computing environment 204 via the virtual channel (VC) 278 and during a fifth transfer cycle 604. A sixth data object 244 uses the virtual channel (VC) 278 to transfer from the first remote computing environment 204 to the second remote computing environment 240 during a sixth transfer cycle 606. Other embodiments of the computing environments may include any combination of transfer cycles described herein.

Figure 5C:
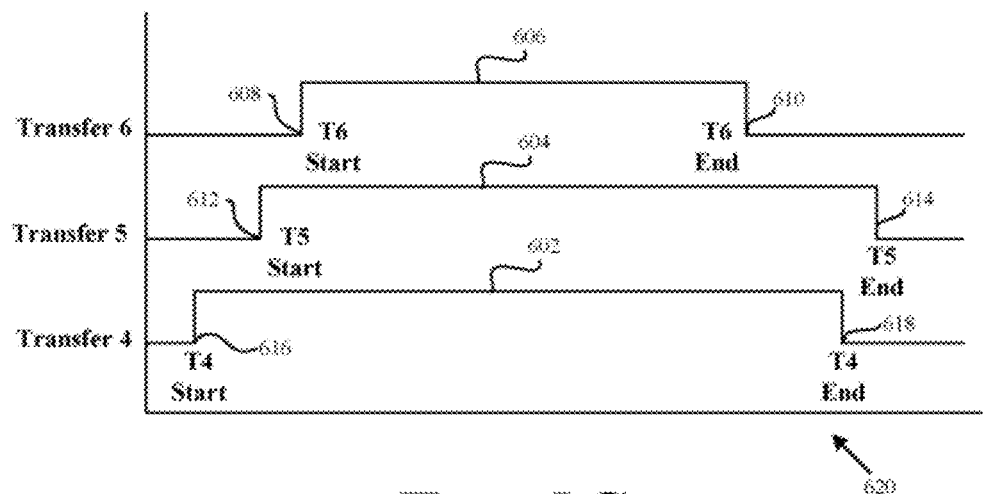
FIG. 5C is a graph that illustrates an embodiment of a plurality transfer cycles.

Illustrated in FIG. 5C is an embodiment of a graph 620 of the transfer cycles 606, 604, 602 illustrated in FIG. 5B. The graph in this embodiment compares the significant points in time during each of the illustrated transfer cycles 606, 604, 602. The fourth transfer cycle 602 commences at a time "T4 Start" 616 and ends at a time "T4 End" 618. The duration of the fourth transfer cycle 602 can be determined by analyzing the lapse in time from the "T4 Start" 616 point in time to the "T4 End" 618 point in time. In this embodiment, the fifth transfer cycle 604 commences at a time "T5 Start" 612 and ends at a time "T5 End" 614. The duration of the fifth transfer cycle 604 can be determined by analyzing the lapse in time from the "T5 Start" 612 point in time to the "T5 End" 614 point in time. The sixth transfer cycle 606 commences at a time "T6 Start" 608 and ends at a time "T6 End" 610. The duration of the sixth transfer cycle 606 can be determined by analyzing the lapse in time from the "T6 Start" 608 point in time to the "T6 End" 610 point in time.

Further referring to FIG. 5C in more detail, in one embodiment, combinations of the start and end times for each of the transfer cycles 602, 604, 606 includes any combination of start time, end time, and transfer cycle described herein.

Figure 6A:
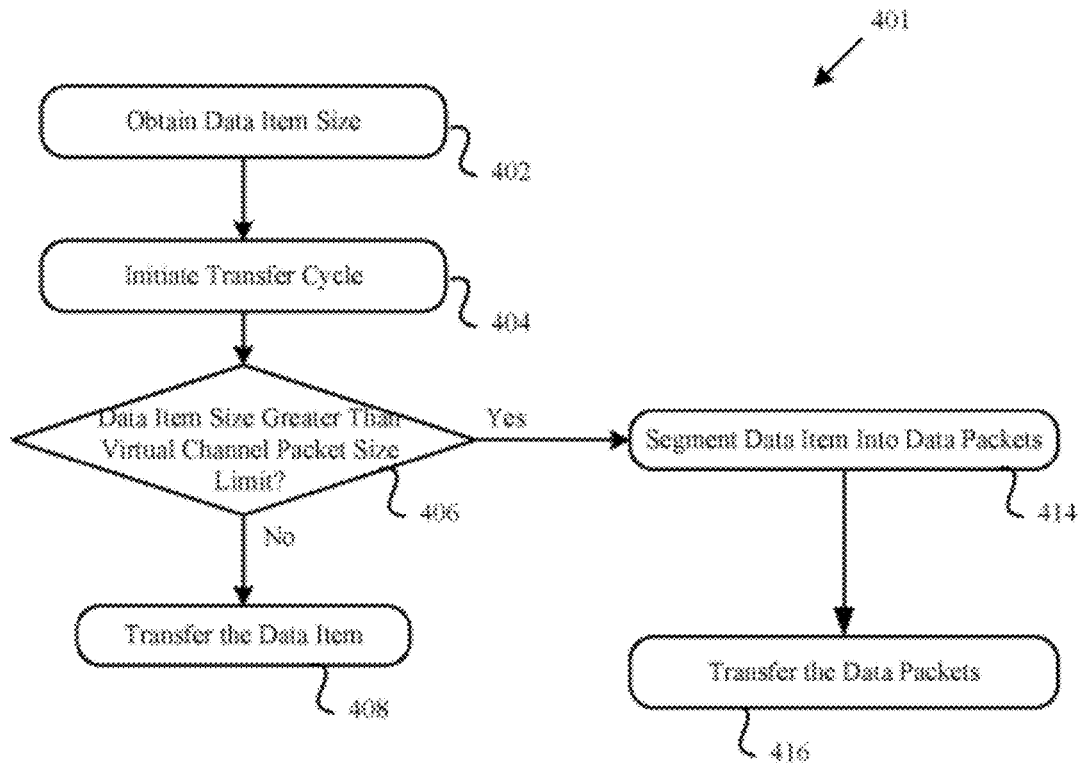
FIG. 6A is a flow diagram illustrating an embodiment of a data transfer method that segments data objects into data packets.

Illustrated in FIG. 6A is an embodiment of a method 401 for segmenting a data item that is larger than the data item size allowed by the virtual channel (VC). The size of the data item is obtained (step 402) and the transfer cycle is initiated (step 404). A determination is made as to whether or not the size of the data item exceeds the maximum virtual channel (VC) packet size limit (step 406). When the size of the data item exceeds the virtual channel (VC) packet size limit (step 406), then the data item is segmented into data packets that are smaller than the original data item (step 414). Each data packet is then transferred to a destination computing environment (step 416). If the size of the data item does not exceed the virtual channel (VC) packet size limit, then the data item is transferred to a destination computing environment (step 408).

Further referring to FIG. 6A in more detail, in this embodiment, the size of the data item is obtained (step 402). Size information includes the number of bytes or the number of bits included in the data item. In one embodiment of the method 401, the size of the data item is obtained from the drag-and-drop (DnD) agent in the source computing environment. Other embodiments of the method 401 include obtaining the size of the data item from the drag-and-drop (DnD) virtual channel (VC) manager in the source computing environment. Still other embodiments of the method 401 deduce the size of the data item from attributes of the data item obtained when the data object is selected. In one embodiment of the method 401, the size of the data item is obtained from user-input.

In one embodiment of the method 401, a transfer cycle is initiated (step 404), and a determination is made as to whether or not the size of the data item exceeds the packet size limit imposed by the virtual channel (VC) (step 406). In one embodiment, the transfer cycle is initiated using information obtained about the size of the data item. Other embodiments of the transfer cycle may include any combination of transfer cycle parameters or attributes described herein. One embodiment of the method 401 includes a drag-and-drop (DnD) agent in either the destination computing environment or the source computing environment able to determine whether the size of the data item exceeds the limit associated with the virtual channel (VC). Another embodiment of the method 401 includes a drag-and-drop (DnD) virtual channel (VC) manager or other virtual object able to determine whether or not the size of the data item exceeds the virtual channel (VC) size limit. Still other embodiments include an initialization of the transfer cycle (step 404) that includes determining whether or not the size of the data item exceeds virtual channel (VC) limits. In other embodiments, a determination as to whether or not the data item exceeds data size limits includes measuring the size of the data item against any one of the following: local computing environment imposed data packet size limits; remote computing environment imposed data packet size limits; network imposed data packet size limits; user-defined data packet size limits; application-defined data packet size limits; or any other computing environment limitation on the size of a data packet to be transferred among computing environments.

When, in this embodiment of the method 401, the size of the data item exceeds the data packet limitation imposed by the virtual channel (VC) (step 406), the data item is segmented into data packets that have a smaller size than the size of the data item (step 414). In one embodiment of the method 401, the data item is segmented into data packets that are a uniform size, while in another embodiment the data item is segmented into data packets that are non-uniform size. Other embodiments of the method 401 may segment the data item into data packets that are characterized by a header that identifies the segmented data item, and the segment of the data item included in the data packet. In still the another a header is part of the data packet that includes the data item.

When the size of the data item does not exceed the limit imposed by the virtual channel (VC), the data item is transferred to the destination computing environment (step 408). When the data item is segmented into data packets (step 414), each data packet is transferred to the destination computing environment (step 416). Embodiments of the method 401 transfer the data item or data packets according to the methods and parameters of data item transfer described herein.

Figure 6B:
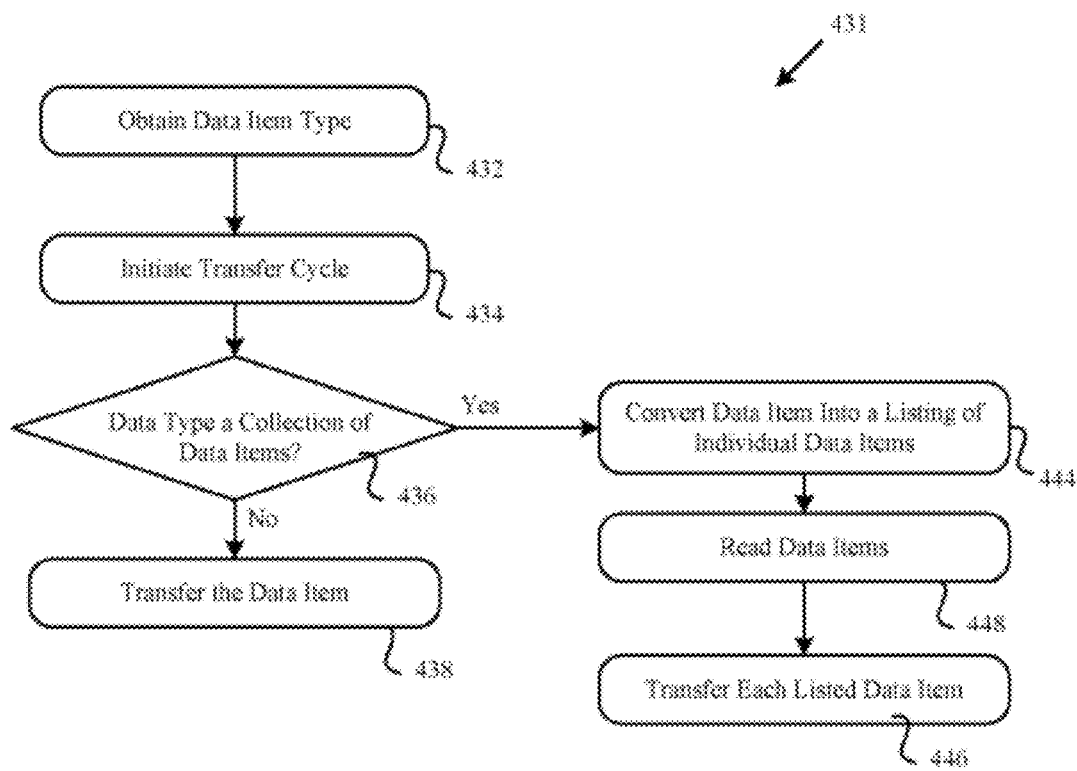
FIG. 6B is a flow diagram illustrating an embodiment of a data transfer method that converts a collection of data items into individual data items.

Illustrated in FIG. 6B is an embodiment of a method 431 for converting a data item into a listing of individual data items. The type of the data item is obtained (step 432) and the transfer cycle is initiated (step 434). A determination is made as to whether or not the data type of the data item is a collection of data items (step 436). If the data item is a collection of data items (step 436), then the data item is converted into a listing of individual data items (step 444). Each data item read (step 448) and the corresponding data item is transferred to a destination computing environment (step 446). If the data item is not a collection of data items, then the data item is transferred to a destination computing environment (step 408).

Further referring to FIG. 6B in more detail, in this embodiment, the data type of the data item is obtained (step 432). Data type information includes information indicating that the data item is a folder that contains files or any other data type where the data item is a repository for more than one individual data item. In one embodiment of the method 431, the data type of the data item is obtained from the drag-and-drop (DnD) agent in the source computing environment. Other embodiments of the method 431 include obtaining the data type from the drag-and-drop (DnD) virtual channel (VC) manager in the source computing environment. Still other embodiments of the method 431 deduce the data type of the data item from attributes of the data item obtained when the data object is selected. In one embodiment of the method 431, the data type of the data item is obtained from user-input.

In one embodiment of the method 431, a transfer cycle is initiated (step 434), and a determination is made as to whether or not the data type is a collection of data items (step 436). In one embodiment, the transfer cycle is initiated using information obtained about the data type of the data item. Other embodiments of the transfer cycle may include any combination of transfer cycle parameters or attributes described herein. One embodiment of the method 431 includes a drag-and-drop (DnD) agent in either the destination computing environment or the source computing environment able to determine whether the data type of the data item is a collection of data items. Another embodiment of the method 431 includes a drag-and-drop (DnD) virtual channel (VC) manager or other virtual object able to determine whether or not the data type of the data item is a collection of data items.

When, in this embodiment of the method 431, the data type of the data item is a collection of data items, the data item is converted from a collection of data items into a listing of individual data items (step 444). In one embodiment of the method 431, a listing of data items includes location information used by either a drag-and-drop (DnD) agent or a drag-and-drop (DnD) virtual channel (VC) manager to access each individual data item and transfer the individual data item from the source computing environment to the destination computing environment. Still other embodiments include a data item where the individual data items are included in the data item such that when the data item is transferred to the destination computing environment, the individual data items travel with the data item to the destination computing environment. An example of a data item that represents a collection of data items that must be listed is a file folder that groups together more than one individual data file. In one embodiment, individual data items are transferred sequentially from the source computing environment to the destination computing environment.

In one embodiment of the method 431, when the data type is not a collection of data items, the data item is transferred to the destination computing environment (step 438). When, in one embodiment, the data item is converted into a listing of individual data items (step 444), then each of the listed data items is read (step 446) and the corresponding data item is transferred to the destination computing environment (step 448). In one embodiment of the method 431, to read a listed data item is to identify the location of the data item within the source computing environment. Using the location of the read data item, the data item is retrieved from within the source computing environment and transferred to the destination computing environment.

Figure 7:
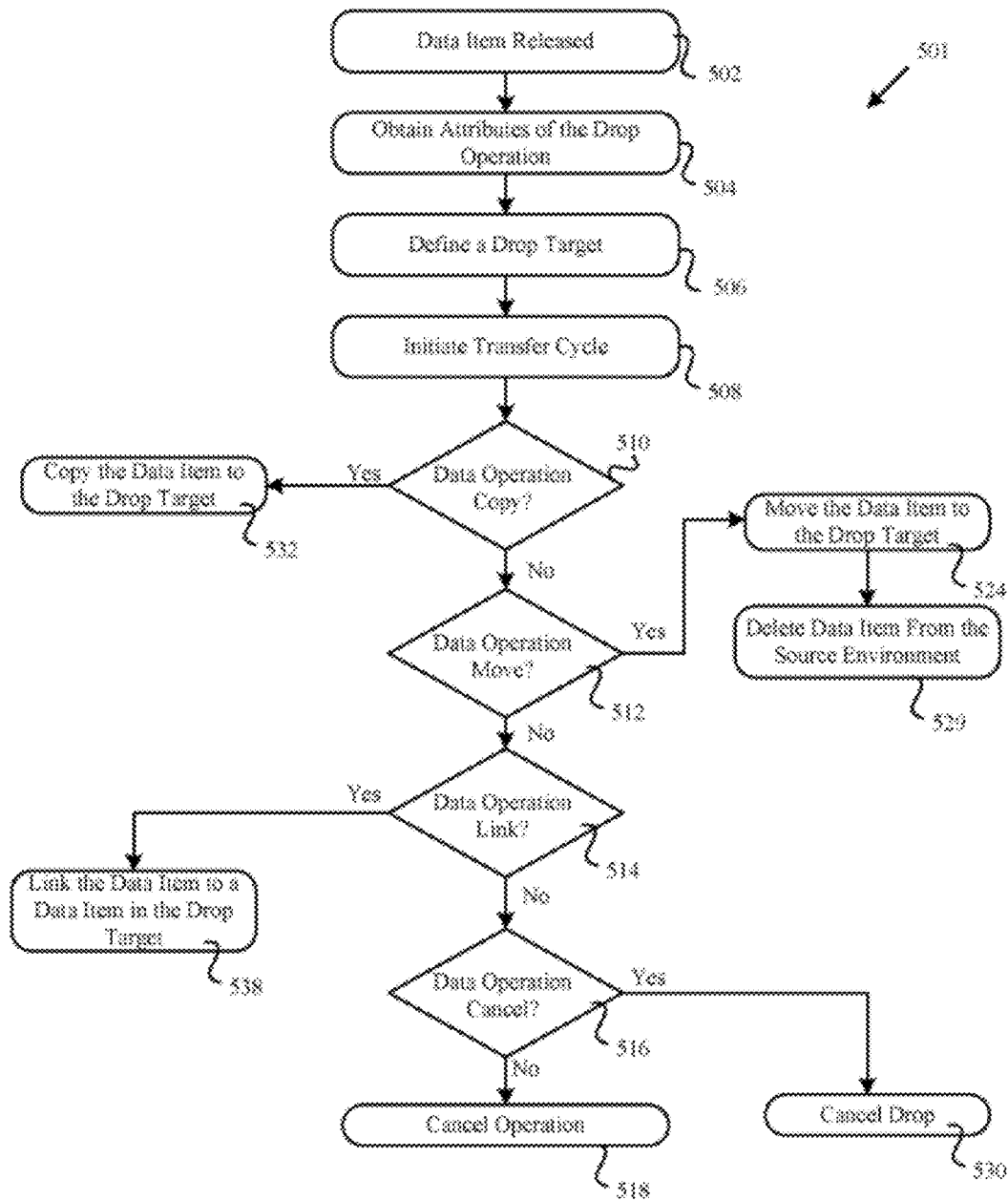
FIG. 7 is a flow diagram illustrating an embodiment of a data transfer method that performs a data operation on a data object.

Illustrated in FIG. 7 is an embodiment of a method 501 for transferring a data item from a source computing environment to a destination computing environment. The method 501 commences when the data item is released into the destination environment (step 502). Attributes of the drop operation are obtained (step 504) which are further used to define a drop target within the destination computing environment (step 506) and initiate a drop cycle (step 508). A determination is made as to whether or not the data operation is a copy operation (step 510), and if the data operation is a copy operation, then the data item is copied onto the drop target in the destination environment (step 532). When the data operation is not a copy operation, a determination is made as to whether or not the data operation is a move operation (step 512), and if the data operation is a move operation then the data item is moved to the drop target in the destination environment (step 524), and the data item is deleted from the source environment (step 529). If the data operation is not a move operation, a determination is made as to whether or not the data operation is a link operation (step 514), and if the data operation is a link operation then the data item is linked to a data item located in the drop target in the destination computing environment (step 538). When the data operation is not a link operation, a determination is made as to whether or not the data operation is a cancel operation (step 516). If the data operation is a cancel operation, then the transfer cycle ends and the drop action is cancelled (step 530). If the data operation is not a cancel operation, then the drop operation is cancelled (step 518).

Further referring to FIG. 7, in the illustrated embodiment of the method 501 detects the release of the data item into the destination environment (step 502). The method 501 then obtains attributes of the drop operation (step 504), defines a drop target (step 506), and initiates a transfer cycle (step 508). In other embodiments of the method 501, these actions can be combined into one action executed when the data item is released into the destination environment. In one embodiment, the attributes of the drop operation include information relating to: the user-chosen data operation to be applied to the selected data item; characteristic information about the drop target in the destination computing environment; attributes of the data item including data type and data size; the parameters within which the transfer cycle should operate; or any other attribute relevant to transferring the data item from the source environment and dropping the data item in the destination environment. Still other embodiments include obtaining drop attributes such as any of those drop attributes described herein.

In this embodiment of the method 501, a determination is made as to whether or not the data operation is a copy operation (step 510), and if the operation is a copy operation, the data item is copied from the source computing environment to the drop target within the destination computing environment (step 532). A copy operation, in this embodiment, causes a copy of the selected data item to be transferred to the drop target. Rather than deleting the data item from the source computing environment as is done during a move operation, the copy operation preserves the data item within the source computing environment, and creates a copy of the selected data item on the drop target within the destination computing environment.

When the data operation is not a copy operation, a determination is made as to whether or not the data operation is a move operation (step 512). In this embodiment, if a determination is made that the data operation is a move operation, then the selected data item is moved from the source computing environment to the drop target within the destination computing environment (step 524), and the data item is deleted from the source environment (step 529). The move operation, in the embodiment, transfers a copy of the selected data item to the drop target within the destination computing environment (step 524), and further deletes the remaining data item copy from the source computing environment. When, in some embodiments, the movement of the data item is from one remote environment to another remote environment, and where each of the remote environments are housed on a common computing machine; the move operation redefines the memory location of the moved data item.

If the data operation is not a move operation, then a determination is made as to whether or not the data operation is a link operation (step 514). When the data operation is a link operation, the selected data item in the source computing environment is linked to a data item in the drop target and within the destination computing environment (step 538). In this embodiment, linking a data item in the source computing environment with a data item in the destination computing environment allows the data items to be linked such that modifications to either of the data items causes the other data item to be modified. An example of this would include a file located in the source computing environment that is linked to a shortcut or file located within the destination computing environment. Linking the file with another file or shortcut causes the files to update each other.

Further referring to FIG. 7, when the data operation is not a link operation, a determination is made as to whether or not the data operation is a cancel operation (step 516), and if the data operation is a cancel operation, the drop operation and the transfer cycle are stopped (step 530). A cancel operation, in this embodiment, cancels the current transfer such that the selected data item is not transferred to the destination computing environment, and the state of both the source and destination computing environments remain the same. In one embodiment, determination of whether or not the operation is a cancel operation (step 516) includes determining whether or not the user has entered an escape command via a keyboard or other input device, that indicates that the operation should be cancelled. Other embodiments include determining whether or not another user-generated command has been sent to the system indicating that the operation should be cancelled.

When the data operation is not a cancel operation, the drop operation is cancelled (step 518). Other embodiments of the method 501 may transfer the data item when the data operation is neither of the above enumerated operations. In one embodiment, the operation can be cancelled based on user input, such as entering an escape command during the transfer, or based on system feedback indicating that the destination computing environment or the source computing environment does not support the drop operation.

Figure 8:
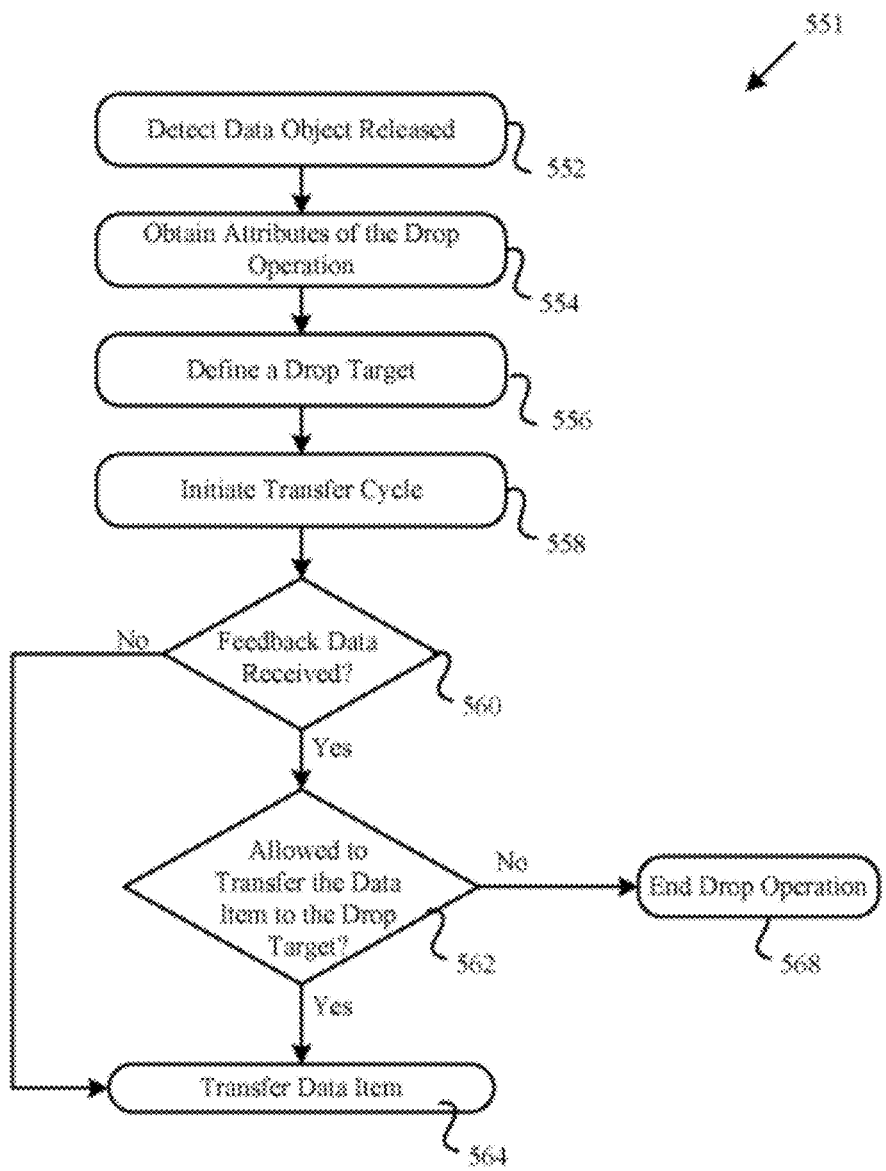
FIG. 8 is a flow diagram illustrating an embodiment of a data transfer method that receives drop feedback.

Illustrated in FIG. 8 is one embodiment of a method 551 for receiving feedback data indicative of data drop information. Data drop information becomes available when a data object is released into a destination computing environment (step 552). Attributes of the drop operation are obtained (step 554), and a drop target is defined (step 556). A transfer cycle is initiated (step 558), and a determination is made as to whether or not feedback data was received (step 560). If feedback data indicative of data drop information was received, then a determination is made as to whether or not the data item is allowed to be transferred to the drop target (step 562). When the data item is allowed to be transferred to the drop target (step 562), then the data item is transferred to the drop target (step 564). When the data item is not allowed to be transferred to the drop target (step 562), the transfer cycle is stopped and the data item is not transferred to the drop target (step 568). If a determination is made that no feedback data was received (step 560), then the data item is transferred to the drop target in the destination computing environment (step 564).

Further referring to FIG. 8 in more detail, in this embodiment of the method 551, the data drop information becomes available in the form of feedback data, when a selected data object is released into a destination computing environment (step 552). The destination computing environment can be a remote computing environment when the source environment is either a local computing environment or a first remote computing environment; or the destination computing environment can be a local computing environment when the source environment is a remote computing environment.

Obtaining attributes of the drop operation (step 554), in this embodiment includes obtaining drop information as described herein. Other embodiments of the method 551 may include obtaining drop information that further describes the data type of the data item, the size of the data item, or data item permissions. In this embodiment, data item permissions indicate the data operations that may be performed on the data item, and whether or not the data item may be transferred from the source computing environment.

The drop target is defined (step 556), in this embodiment, using information obtained regarding the drop operation (step 554). Information such as the location of the data item within the source computing environment, and the location of the drop target within the destination computing environment can, in some embodiments, be included within the attributes of the drop operation. Other embodiments may obtain the location of the drop target and the location of the data item when the drop target is defined (step 556).

In one embodiment of the method 551, a drop target is defined (556). The drop target is located in either a local computing environment or a remote computing environment. The drop target is located in the destination environment such that either the remote or local computing environment functions as the destination computing environment. In one embodiment of the method 551, the drop target is a file directory location. An example of this embodiment would be a drop target that is located on the desktop of a remote computing environment. Other embodiments include a drop target that is within an application executing within the destination computing environment. An example of this embodiment would be a drop target that is a text file able to accept a text data item from the source computing environment.

The embodiment shown in FIG. 5 initiates a transfer cycle (step 558). Initiating the transfer cycle can include any of the above mentioned methods or techniques. In one embodiment, initiating the transfer cycle includes defining the parameters of the transfer from the source computing environment to the destination computing environment using drop operation and drop target information.

A determination is made, in this embodiment, as to whether or not feedback data was received (step 560). In this embodiment, feedback data may be passed to the method 551 when either the attributes of the drop operation are obtained (step 554), the drop target is defined (step 556), or the transfer cycle is initiated (step 558). Feedback data, in one embodiment, is gathered by the drag-and-drop (DnD) virtual channel (VC) manager in the destination computing environment and transferred to the drag-and-drop (DnD) virtual channel (VC) manager in the source computing environment. Other embodiments include feedback data that is gathered by the drag-and-drop (DnD) agent in the destination computing environment and transferred to the drag-and-drop (DnD) agent in the source computing environment. Still other computing environments include feedback data gathered by the session viewing window and transferred to either the drag-and-drop (DnD) agent or the drag-and-drop (DnD) virtual channel (VC) manager in the local computing environment.

Feedback data, in one embodiment of the method 551, can include any one of the following types of data information: data drop permissions; data drop status; data drop attributes; transfer status information; data item size information; data packet size information; virtual channel (VC) data packet size limit information; graphical feedback data for generating an image of the cursor; graphical feedback data for generating an image within either of the computing environments; destination computing environment system information; source computing environment system information; network connectivity information; virtual channel (VC) connectivity information; information regarding a change in state of input devices included within either of the computing environments; or any other type of feedback data characteristic of the transfer of a data item among computing environments. In another embodiment, feedback data can be received before the data object is released into the destination computing environment (step 552). In this embodiment visual feedback such as a change in the cursor appearance, or application message feedback such as a message or error box; may be shown to the user indicating that the operation can not be performed. This visual or application feedback is indicative of the inability of the destination computing environment to support the drop operation, or the inability of the source computing environment to commence the drop operation. The feedback data received can be any of the feedback data described herein, and can further include any feedback data that would indicate an inability of a computing environment to carry out the intended operation.

If, in one embodiment of the method 551, feedback data is received, then a determination is made as to whether or not the data item is allowed to transfer to the drop target (step 562). Feedback data can include providing the source computing environment with a set of callback functions to the destination computing environment. These callback functions can be used by the destination computing environment to provide feedback data to the source computing environment, and can be used by the source computing environment to provide the destination computing environment with information requested by the destination computing environment. Feedback data can include data indicative of whether or not the data item may be transferred from the source computing environment, and indicative of whether or not the data item may be transferred to the destination computing environment. If the data item may not be transferred from the source computing environment or to the destination computing environment, then the drop operation and the data item transfer is stopped (step 568).

In one embodiment of the method 551, when feedback data is not received, or when feedback data is received and the data item is allowed to transfer to the drop target; the data item is transferred to the drop target (step 564). Transfer of the data item takes place between either a local computing environment and a remote computing environment, or a remote computing environment and a remote computing environment. Other embodiments of the method 551 carry out the transfer of the data item according to any combination of the methods described herein.

What is claimed is:

1. A method for parallel transfer of a plurality of data items between a plurality of computing environments, the method comprising:
   detecting, by a transfer agent executed by a processor of a first computing device, a release in a destination computing environment of a first graphical object, representing a first data item, dragged from a source computing environment;
   transferring, during a first transfer cycle, initiated responsive to the detection of release of the first graphical object, the first data item from the source computing environment to the destination computing environment, wherein transferring the first data item comprises defining a location of a drop target in the destination computing environment and transferring the first data item to the defined drop target;
   detecting, by the transfer agent, a release of a second graphical object, representing a second data item, dragged from one of the destination computing environment and the source computing environment to the other of the destination computing environment and the source computing environment; and
   transferring, during a second transfer cycle initiated during execution of the first transfer cycle responsive to the detection of release of the second graphical object and during at least a portion of the first transfer cycle, the second data item correspondingly from one of the destination computing environment and the source computing environment to the other of the destination computing environment and the source computing environment.

2. The method of claim 1, wherein at least one of the source computing environment and the destination computing environment comprises a remote computing environment executed by a processor of a second computing device accessed via a remote access session.

3. The method of claim 2, wherein transferring the first data item from the source computing environment to the destination computing environment further comprises transferring the first data item via a virtual channel between the first computing device and a second computing device.

4. The method of claim 3, wherein transferring the second data item further comprises transferring the second data item via the virtual channel.

5. The method of claim 4, further comprising transferring packets of the first and second data items via the virtual channel in a round-robin allocation.

6. The method of claim 1, wherein the source computing environment comprises a first remote computing environment executed by a processor of a second computing device accessed via a first remote access session, and wherein the destination computing environment comprises a second remote computing environment executed by a processor of a third computing device accessed via a second remote access session.

7. The method of claim 6, wherein transferring the first data item from the source computing environment to the destination computing environment further comprises:
   transferring the first data item from the source computing environment to a local computing environment executed by the first computing device; and
   transferring the first data item from the local computing environment to the destination computing environment.

8. The method of claim 6, wherein transferring the first data item from the source computing environment to the destination computing environment further comprises transferring the first data item from the source computing environment via a virtual channel established between the second computing device and the third computing device.

9. A system for parallel transfer of a plurality of data items between a plurality of computing environments, the system comprising:
   a first computing device, comprising a processor executing a transfer agent, the transfer agent configured for:
      detecting a release in a destination computing environment of a first graphical object, representing a first data item, dragged from a source computing environment,
      transferring, during a first transfer cycle, initiated responsive to the detection of release of the first graphical object, the first data item from the source computing environment to the destination computing environment, wherein transferring the first data item comprises defining a location of a drop target in the destination computing environment, and transferring the first data item to the defined drop target,
      detecting a release of a second graphical object, representing a second data item, dragged from one of the destination computing environment and the source computing environment to the other of the destination computing environment and the source computing environment, and transferring, during a second transfer cycle initiated during execution of the first transfer cycle responsive to the detection of release of the second graphical object and during at least a portion of the first transfer cycle, the second data item correspondingly from one of the destination computing environment and the source computing environment to the other of the destination computing environment and the source computing environment.

10. The system of claim 9, further comprising a second computing device comprising a processor executing a remote computing environment, the remote computing environment comprising one of the source computing environment and the destination computing environment, accessed by the first computing device via a remote access session.

11. The system of claim 10, wherein the transfer agent is further configured for transferring the first data item via a virtual channel between the first computing device and the second computing device.

12. The system of claim 11, wherein the transfer agent is further configured for transferring the second data item via the virtual channel.

13. The system of claim 12, wherein the transfer agent is further configured for transferring packets of the first and second data items via the virtual channel in a round-robin allocation.

14. The system of claim 9, further comprising:
a second computing device comprising a processor executing a first remote computing environment comprising the source computing environment, accessed by the first computing device via a first remote access session; and
a third computing device comprising a processor executing a second remote computing environment comprising the destination computing environment, accessed by the first computing device via a second remote access session.

15. The system of claim 14, wherein the transfer agent is further configured for:
transferring the first data item from the source computing environment to a local computing environment executed by the first computing device; and
transferring the first data item from the local computing environment to the destination computing environment.

16. The system of claim 14, wherein the transfer agent is further configured for transferring the first data item from the source computing environment via a virtual channel established between the second computing device and the third computing device.

* * * * *